(12) United States Patent
Bosse et al.

(10) Patent No.: US 11,794,756 B2
(45) Date of Patent: Oct. 24, 2023

(54) ESTIMATING VEHICLE VELOCITY BASED ON VARIABLES ASSOCIATED WITH WHEELS

(71) Applicant: Zoox, Inc., Foster City, CA (US)

(72) Inventors: Michael Carsten Bosse, Cupertino, CA (US); Brice Rebsamen, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 183 days.

(21) Appl. No.: 17/463,004

(22) Filed: Aug. 31, 2021

(65) Prior Publication Data

US 2023/0001934 A1      Jan. 5, 2023

Related U.S. Application Data

(63) Continuation-in-part of application No. 17/364,161, filed on Jun. 30, 2021.

(51) Int. Cl.
*B60W 40/105* (2012.01)
*B60W 40/114* (2012.01)
(Continued)

(52) U.S. Cl.
CPC ........ *B60W 40/105* (2013.01); *B60W 30/045* (2013.01); *B60W 40/114* (2013.01);
(Continued)

(58) Field of Classification Search
CPC ............ B60W 40/105; B60W 30/045; B60W 2530/201; B60W 2510/205; B60W 2520/28; B60W 2710/207; G06F 17/17
See application file for complete search history.

(56) References Cited

U.S. PATENT DOCUMENTS 6,789,017 B2      9/2004   Aanen et al.
2011/0125359 A1*  5/2011   Nakao ................. G01C 22/025
                                                         701/31.4
(Continued)

FOREIGN PATENT DOCUMENTS

CN    104802803 B  *  4/2017
JP    2001219840 A     8/2001
KR    20130048411 A    5/2013

OTHER PUBLICATIONS

The PCT Search Report and Written Opinion dated Sep. 26, 2022 for PCT application No. PCT/US2022/033609, 12 pages.
(Continued)

*Primary Examiner* — Jeff A Burke
*Assistant Examiner* — Jerrod Irvin Davis
(74) *Attorney, Agent, or Firm* — Lee & Hayes, P.C.

(57) ABSTRACT

Techniques are described for using variables associated with vehicle wheels (e.g., linear velocity at a wheel and orientation of the wheel) to estimate velocity of a vehicle during a turn maneuver. In examples of the disclosure, in association with one or more wheels, a wheel orientation during the maneuver and a linear speed during the maneuver may be determined, and well as a yaw rate (e.g., from an inertial measurement unit, gyroscope, etc.) of the vehicle. Examples of the present disclosure include, based on the variables associated with the wheel(s) and the yaw rate associated with the turn maneuver, estimating a vehicle velocity, which may be used by various downstream components, such as to determine or update a pose of a vehicle as part of a localization operation.

20 Claims, 7 Drawing Sheets

(51) Int. Cl.
*G06F 17/17* (2006.01)
*B60W 30/045* (2012.01)
(52) U.S. Cl.
CPC ......... *G06F 17/17* (2013.01); *B60W 2520/28* (2013.01); *B60W 2710/207* (2013.01)

(56) References Cited

U.S. PATENT DOCUMENTS

| | | |
|---|---|---|
| 2013/0151066 A1 | 6/2013 | Koukes et al. |
| 2015/0134204 A1 | 5/2015 | Kunihiro et al. |
| 2016/0375948 A1* | 12/2016 | Takenaka ................. B62K 5/08 280/5.506 |
| 2018/0057054 A1 | 3/2018 | Tokoro |
| 2019/0009708 A1 | 1/2019 | Siegling |
| 2020/0207412 A1 | 7/2020 | Al Assad et al. |
| 2020/0331317 A1* | 10/2020 | Nasu ..................... B60W 10/08 |
| 2021/0206430 A1* | 7/2021 | North .................... B62D 11/04 |
| 2023/0001915 A1 | 1/2023 | Bosse |

OTHER PUBLICATIONS

How to Calculate Wheel Speed, retrieved at <<https://sciencing.com/calculate-wheel-speed-7448165.html>>, 2019, 3 pgs.
Office Action for U.S Appl. No. 17/364,161, dated Feb. 14, 2023, Bosse, "Estimating Angle of a Vehicle Wheel Based on Non-Steering Variables", 12 Pages.

\* cited by examiner

ESTIMATING VEHICLE VELOCITY BASED ON VARIABLES ASSOCIATED WITH WHEELS

CROSS REFERENCE TO RELATED APPLICATIONS

This application is a continuation-in-part of U.S. application Ser. No. 17/364,161 (filed Jun. 30, 2021), which is incorporated herein by reference in its entirety for all purposes.

BACKGROUND

A vehicle velocity (e.g., speed and direction) may be used in various contexts. For example, a vehicle velocity may be continuously tracked over time to estimate the relative position of a vehicle as the vehicle maneuvers from one position to another. That is, from a given position, the speed and direction of the vehicle may be continuously updated to track the path or trajectory along which the vehicle is traveling. In some instances, the path or trajectory may be determined relative to a map (e.g., as part of localization) to determine the position (e.g., pose) of the vehicle relative to the map. Accurate localization is important for various operations, such as for determining proper next maneuvers for a vehicle to execute (e.g., to stay on drivable surfaces, to avoid obstacles, to successfully maneuver to a destination, etc.), and as such, accurate velocity determinations are also important. In some instances, velocity may be determined using various approaches, some of which may rely on sensors, such as steering sensors, yaw rate sensors, and the like. However, some sensor data may introduce noise or other inaccuracies into the velocity calculation, which can affect localization and/or other downstream processes that use the velocity determination(s).

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1A:
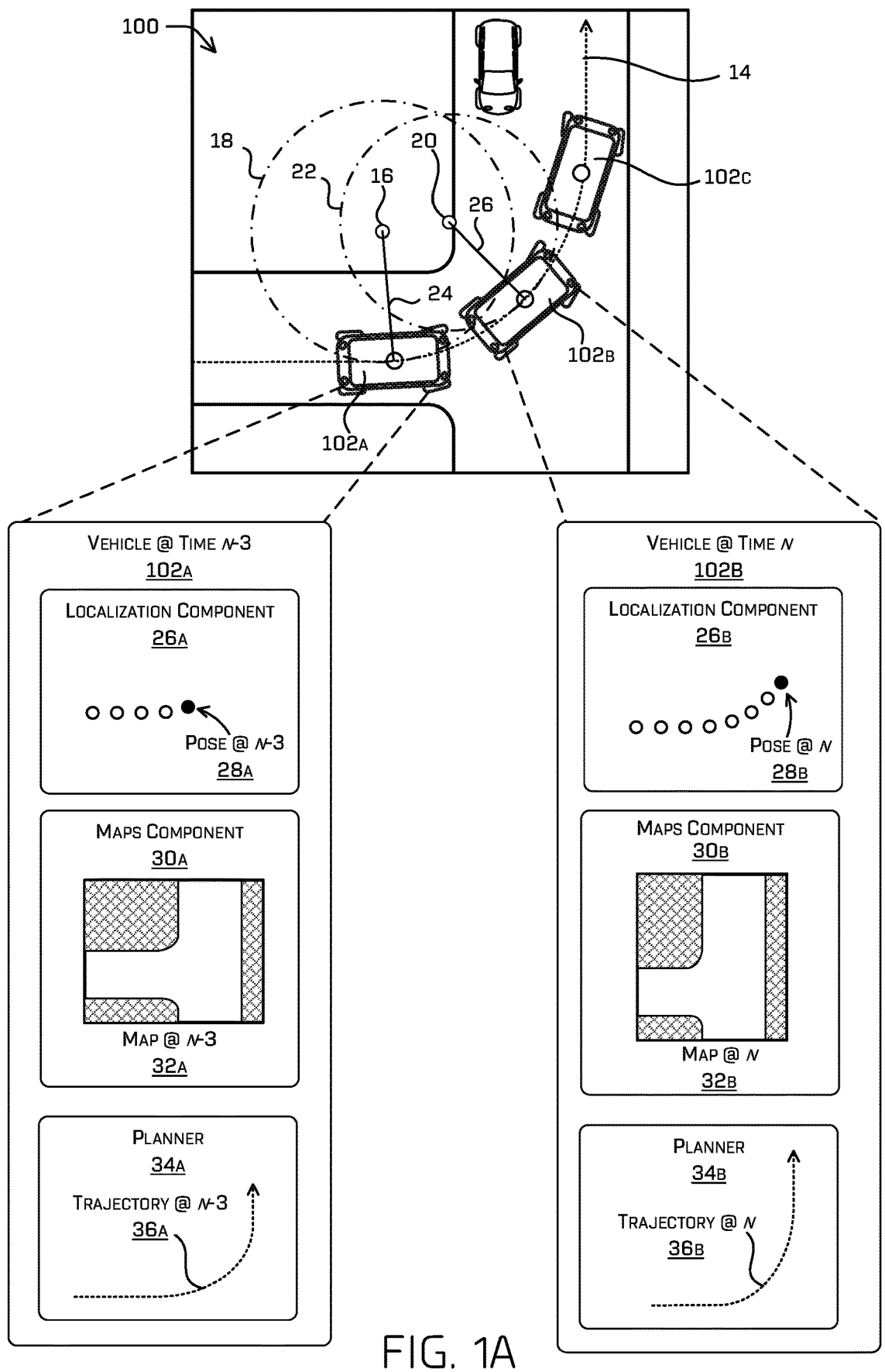
FIG. 1A illustrates a vehicle executing one or more turn maneuvers in an environment, as described herein.

As discussed above, accuracy and reliability of vehicle velocity determinations are important in various contexts, such as for vehicle localization. This application relates to techniques for using multiple velocities at different points of a vehicle to estimate a velocity of the vehicle at a reference point (e.g., a centralized reference point). The velocities at different points may be determined in various manners, and in some examples, variables associated with vehicle wheels (e.g., linear velocity or speed at a wheel and orientation of the wheel) are used to estimate velocity of a vehicle. In examples of the disclosure, a wheel orientation and a linear speed during a maneuver may be determined for a wheel of the vehicle. Furthermore, a yaw rate (e.g., from an inertial measurement unit, gyroscope, etc.) of the vehicle during the turn maneuver may also be determined. Examples of the present disclosure include, based on the velocities at different points on the vehicle (e.g., based on variables associated with the wheels) and the yaw rate associated with the turn maneuver, estimating a vehicle velocity (e.g., $v_x$, $v_y$) during the turn maneuver. In at least some examples, the velocity of the vehicle may be used by various downstream components, such as to determine or update a pose of a vehicle as part of a localization operation.

As a vehicle traverses through an environment (e.g., when maneuvering along a roadway, searching for a parking spot, actively parking, etc.), the vehicle often executes a series of maneuvers, and as the maneuvers are executed, it can be useful to track sequential positions of the vehicle. In some instances, tracking and iterating sequential positions may enable a determination of relative positions of the vehicle over time. For example, from a given initial position, sequential positions may be tracked and combined to determine a current position of the vehicle relative to the initial position. In additional examples, such as where a map represents the environment in which the vehicle is maneuvering and a pose (e.g., position and orientation) relative to the map is determined, the sequential positions may be tracked relative to the map in order to monitor the movement of the vehicle through (relative to) the environment.

Positions of a vehicle may be determined using various techniques. In examples of the present disclosure, the vehicle velocity (e.g., speed and direction) may be continuously determined as the vehicle executes driving maneuvers, and a vehicle velocity may be used to iteratively update the position of the vehicle. In this way, the positions may be linked together, one after the next, to track a position of the vehicle. For instance, in at least some examples, a vehicle velocity is determined in association with a turn maneuver, which may be combined with a subsequent vehicle velocity determined in association with a subsequent turn maneuver. According to some techniques describe herein, the vehicle velocity may be estimated based on the yaw rate and variables associated with the wheels, such as the linear speed of the vehicle at the wheels and the estimated wheel angles (or some other velocity associated with the wheel). In other examples, velocities of the vehicle at different points on the vehicle may be based on data received from sensors associated with those different points (e.g., sensors mounted at different points along a bumper or undercarriage frame).

In examples of the present disclosure, a speed of the vehicle at the wheels and during the turn maneuver is determined. The speed of the vehicle at a wheel may be determined using various techniques. For example, the speed at a wheel may be based on sensor data from a wheel encoder or other sensor. In examples of the present disclosure, a speed of the vehicle at multiple wheels may be determined (e.g., at two wheels, three wheels, four wheels, etc.), and as explained below, the speeds may be used (with other variables) to determine a vehicle velocity.

In addition to determining the speed of the vehicle at the wheels, examples of the present disclosure include determining the angle or orientation of the wheels during the turn maneuver. In examples, the speed and the wheel angle may represent a velocity. A wheel angle may be determined using various techniques. For example, in some instances, the wheel angle may be determined based on steering sensor data. In some examples of the present disclosure, the wheel angle may be determined or estimated based on non-steering variables (e.g., variables that are independent of a steering system). As used in this disclosure, the angle of a wheel is an angle between the orientation of the wheel (e.g., a direction in which the wheel is pointed) and the longitudinal orientation or axis of the vehicle. In examples of this disclosure, a yaw rate (e.g., from an inertial measurement unit, gyroscope, etc.), a linear speed at or near a wheel speed (e.g., from an encoder), and vehicle dimensions (e.g., distance between the wheel and a turn-center reference line), can be used to estimate the angle of the wheel. Among other things, angles estimated based on non-steering variables may provide redundancy (e.g., when determined in parallel with steering-based angles) and validation and may be less susceptible to inaccuracies from steering-component slippage and/or loss of tire traction, model inaccuracies, and the like. In addition, estimated wheel angles may be used in various manners, such as for estimating vehicle velocity.

A vehicle may include various steering components used to affect or control an angle of a vehicle wheel. For example, a vehicle may include a steering motor that generates a rotational output, which is transferred to a wheel and/or to linear travel of a steering rack. A steering sensor may measure the rotation of the steering motor, and the rotation may be used to determine (e.g., from a correlation between rotation and linear rack travel) steering rack travel (or other steering data associated with a command angle of the wheel). In other examples, steering rack travel may be directly measured or may be derived from other sensor data associated with the steering system or the suspension assembly. This steering data (e.g., motor rotation data, rack travel distance, etc.) may in turn be used to estimate an angle of a wheel. In some instances, steering components (e.g., belts, racks, pinions, gear teeth, etc.) may experience slippage (e.g., mechanical slip) that can affect the accuracy of the steering-based estimated angle. In other instances, the wheel may lose traction against pavement, which can cause an inconsistency between the angle commanded by the vehicle and the actual angle.

In examples of this disclosure, by using non-steering variables to estimate a wheel angle, the determination may avoid or mitigate inaccuracies that can arise from relying solely on the steering system (e.g., inaccuracies arising from steering-component component slippage or wear, loss of tire traction, model-predication inaccuracies, etc.). For example, determining the estimated wheel angle based on the yaw rate, linear velocity, and vehicle dimensions may, in some instances, provide a more accurate estimate as opposed to relying solely on steering sensor data, which can be noisy or affected by mechanical slippage in the steering components (e.g., belts, links, joints, knuckles, etc.). The estimated angle may be used in various respects to control vehicle operations. For example, as indicated above, the estimated angle may be used to determine vehicle velocity. In addition, the estimated angle may be compared to a commanded wheel angle to determine whether the commanded wheel angle was executed. As used in this disclosure, a "commanded wheel angle" is a wheel angle generated by one or more vehicle components and selected for executed by the vehicle. For example, a trajectory planner may select a trajectory (e.g., turn maneuver) to be executed by the vehicle, and the trajectory may include a wheel angle (e.g., the commanded wheel angle) at which a wheel should be turned (e.g., by using steering components) in order to execute the trajectory. In other examples, a steering wheel may be rotated to a degree that correlates with a wheel angle (e.g., the commanded wheel angle), which can be attempted using the steering motor, rack, and/or other steering components. Based on these examples, the commanded wheel angle may be generated or provided by the trajectory planner and/or by the steering components. For example, the commanded wheel angle may be an angle that is provided by (or retrieved from) a vehicle-trajectory planner, steering components (e.g., steering sensor, steering motor, and/or steering rack), or any combination thereof.

In examples of the disclosure, by comparing the estimated angle to the commanded wheel angle, the reliability of various information and components may be assessed. For example, the reliability of the commanded wheel angle (e.g., for downstream processing when estimating vehicle velocity) may be assessed, as well as the condition of the steering components (e.g., where sufficient differences between the estimated angle and the commanded wheel angle may suggest component wear, slippage, etc.). In further examples, a difference (e.g., variance) between the estimated angle and the commanded angle may be used to detect and/or flag conditions, such as wheel slip. In additional examples, the estimated angle from non-steering variables may be combined with the commanded angle (e.g., averaged) for use by downstream components (e.g., localization). In addition, the estimated angle may be directly used (e.g., independent of commanded angle) by downstream processes to determine vehicle position or other vehicle states (e.g., velocity), which may be used for localization or other map-related operations. In some examples, a difference may be determined between an estimated wheel angle and a commanded angle and operations that use (e.g., rely on or consume) the wheel angle could be augmented (e.g., increased or decreased accordingly) by the difference.

In examples of this disclosure, once variables associated with wheels have been determined, a set of variables (associated with the turn maneuver) may exist for one or more wheels of the vehicle, including the speed at the wheel and the wheel angle. For example, in association with a four wheeled vehicle, a set of variables may include a speed for a first wheel (e.g., $Vw1$); an angle for the first wheel—or another representation thereof such as a sine of the angle— (e.g., $Sw1$); a speed for a second wheel (e.g., $Vw2$); an angle (or another representation thereof such as a sine of the angle) for the second wheel (e.g., $Sw2$); a speed for a third wheel (e.g., $Vw3$); an angle (or another representation thereof such as a sine of the angle) for the third wheel (e.g., $Sw3$); a speed for a fourth wheel (e.g., $Vw4$); and an angle (or another representation thereof such as a sine of the angle) for the fourth wheel (e.g., $Sw4$). Collectively then, the set of variables associated with the vehicle wheels during the turn maneuver may include, in some examples, Vw1, Sw1, Vw2, Sw2, Vw3, Sw3, Vw4, and Sw4. In examples of the present disclosure, these variables are used in combination with the yaw rate to determine a vehicle velocity (e.g., velocity in x or "$v_x$" and velocity in y or "$v_y$") at a central reference point. For example, a technique in the present disclosure includes applying an optimization, such as a least squares optimization (e.g., Gauss-Newton method), to determine or solve for a vehicle velocity at the central reference point that best matches the set of variables associated with the vehicle wheels. In at least some examples, the optimization is based on the relationship between the velocity of two points fixed on a rigid body (e.g., the velocities at the wheel and the central reference point on the rigid body of the vehicle). That is, a function representing rigid body dynamics may be used to estimate or predict variables associated with the vehicle wheels, and the optimization may minimize the difference between the predicted variables and the measured variables (e.g., Vw1, Sw1, Vw2, Sw2, Vw3, Sw3, Vw4, and Sw4). Among other things, using an optimization may account for measurement noise among the set of variables, as well as outlier variables.

As described above, at least some examples of the present disclosure may determine a velocity at different points on a vehicle (e.g., at wheels of the vehicle) based on a wheel speed and wheel angle. In some examples, the velocity at different points on the vehicle may be determined in other manners, such as based on sensors (e.g., doppler, cameras, etc.) mounted at those different points. As such, where velocities associated with multiple points on the vehicle are used to estimate the velocity at a reference point, a similar optimization may be used to minimize the difference between the velocities associated with those points (e.g., based on sensor data) and the predicted velocities (based on the function). As a non-limiting example, various optical techniques (e.g., bundle adjustment, feature tracking, etc.) may be implemented using camera data from a camera at a point on the vehicle pointed towards the ground to estimate the speed (or velocity) of the vehicle associated with the point where the camera is mounted based on such camera data (images). In such examples, the measured data may be used in the techniques described herein.

The techniques described herein can be implemented in a number of ways to determine vehicle velocity using variables associated with vehicle wheels. In addition, at least some examples include using non-steering variables to estimate wheel angle. Examples are provided below with reference to FIGS. 1A-1C and 2-5. Examples are discussed in the context of autonomous vehicles; however, the methods, apparatuses, and components described herein can be applied to a variety of components (e.g., a sensor component or a robotic platform), and are not limited to autonomous vehicles. In one example, the techniques described herein may be utilized in driver-controlled vehicles. Furthermore, the techniques described herein can be used with real data (e.g., captured using sensor(s)), simulated data (e.g., generated by a simulator), or any combination of the two.

FIG. 1A illustrates a vehicle 102a/b/c progressing through a series of positions in an environment 100 as the vehicle traverses along a trajectory 14. For illustration in FIG. 1A, the vehicle is identified by reference numeral 102a (vehicle 102a) at time n−3 and at a first position along the trajectory 14; the vehicle is identified by reference numeral 102b (vehicle 102b) at time n and at a second position along the trajectory 14; and the vehicle is identified by reference numeral 102c at time n+3 and at a third position along the trajectory 14. In some examples, the operations of the vehicle 102a/b/c to traverse along the trajectory 14 may include multiple turn maneuvers. For example, the vehicle 102a may execute a first turn maneuver, which includes wheels (e.g., front wheels) rotated to one or more first angles or orientations, and the vehicle 102b may execute a second turn maneuver, which includes the wheels (e.g., front wheels) rotated to one or more second angles or orientations that are different from the first.

Figure 1B:
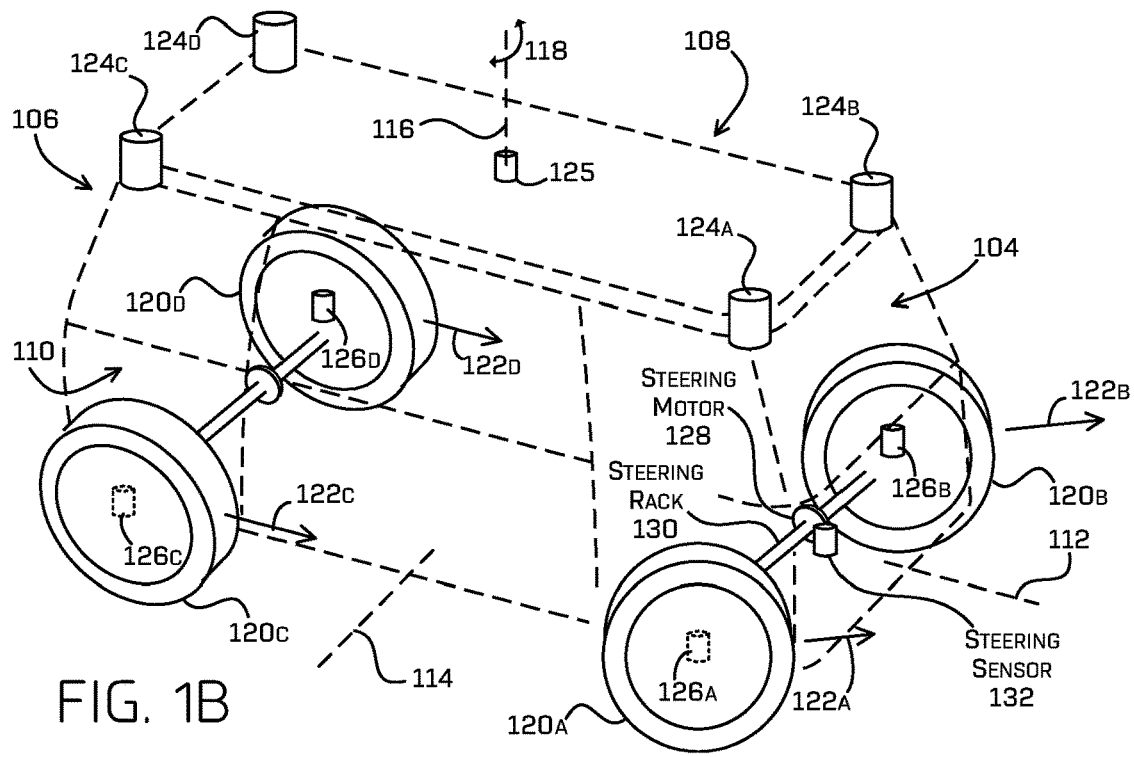
FIG. 1B illustrates a perspective view of an example vehicle with two wheels turned at an angle, as described herein.
Figure 1C:
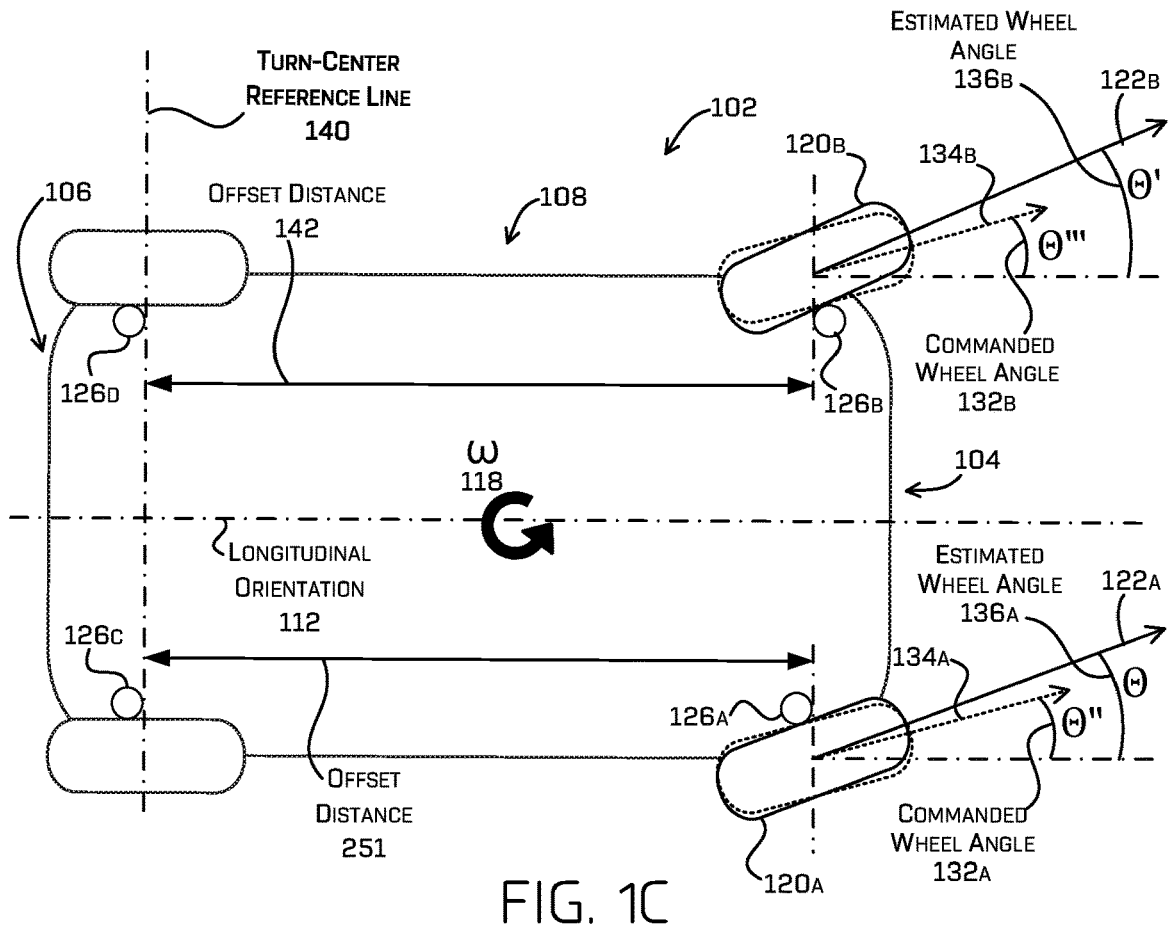
FIG. 1C illustrates a plan view of the vehicle of FIG. 1B showing an estimated wheel angle and a commanded angle for each of the two wheels, as described herein.

The vehicle 102a/b/c may include various components, and referring to FIGS. 1B and 1C, additional examples of the vehicle 102 (representing the vehicle 102a/b/c) are depicted. FIG. 1B depicts a perspective view of the vehicle 102, which is ghosted in broken lines to help illustrate internally positioned components; and FIG. 1C presents a plan view of the vehicle 102, in some examples. Among other things, the vehicle 102 includes a front end 104, a rear end 106, a left side 108, and a right side 110. In addition, for reference in this disclosure, the vehicle 102 includes a longitudinal axis 112 extending along a front-to-back orientation (e.g., longitudinal orientation) and a lateral axis 114 extending along a side-to-side orientation (e.g., lateral orientation) and substantially perpendicular to the longitudinal axis 112. Furthermore, a vertical axis 116 may extend top-to-bottom and perpendicular to the longitudinal axis 112 and to the lateral axis 114. FIG. 1B also depicts a yaw action 118, which indicates the vehicle 102 may rotate relative to the vertical axis 116, such as when the vehicle 102 executes a turn. For example, the vehicle 102 includes four wheels 120a-120d, each oriented in a direction indicated by a respective directional arrow 122a-122d. In FIGS. 1B and 1C, the front wheels 120a and 120b are depicted rotated at a command angle towards the left in a direction indicated by a respective directional arrow 122a and 122b. The placement of the yaw action 118 in FIG. 1B illustrates an example, and the vehicle 102 a yaw action, yaw event, or yaw rotation may occur at various locations or positions of the vehicle.

In one example, the vehicle 102 is a bidirectional vehicle having a first drive module positioned in the front end 104 and a second drive module positioned in the rear end 106. As used herein, a bidirectional vehicle is one that is configured to switch between traveling in a first direction of the vehicle and a second, opposite, direction of the vehicle. In other words, there is no fixed "front" or "rear" of the vehicle 102. Rather, whichever longitudinal end of the vehicle 102 is leading at the time becomes the "front" and the trailing longitudinal end becomes the "rear." In other examples, the techniques described herein may be applied to vehicles other than bidirectional vehicles. Also, whether or not the vehicle is bidirectional, the first drive and second drive modules may be different from one another. For example, one drive module may have a subset of the features of the other drive module. In one such example, the first drive module may include a first, comprehensive set of vehicle systems (e.g., drive motor, battery, steering system, braking system, suspension system, HVAC, sensors, lights, body panels, facia, etc.) while the second drive module includes a limited subset of vehicle systems (e.g., suspension system, braking system, sensors, lights, and facia). In various instances, the wheels positioned in the front end 104 are steerable, and the wheels positioned in the rear end 106 are also steerable, such that the vehicle 102 includes four-wheel steering (e.g., including each set of wheels having the respective steering components). In other examples, the drive modules may have one or more distinct or mutually exclusive vehicle systems (e.g., one drive module has an HVAC system and the other drive module has a drive motor). As another non-limiting example of such, one module may have a first HVAC system while the other drive module has a second HVAC system that is different from the first HVAC system.

In addition, the vehicle 102 may include various sensors for detecting one or more different conditions. For example, the vehicle 102 may include sensors 124a-124d, each of which may include a perception sensor for capturing data of an environment around the vehicle 102 (e.g., lidar, camera, time-of-flight, sonar, radar, etc.). These sensors 124a-124d may be used for various operations, such as object detection, route planning, localization, etc. In at least one example, the vehicle 102 may also include a yaw rate sensor 125, such as an inertial measurement unit (IMU), gyroscope, or other sensor for measuring a yaw rate of the vehicle 102. The position of the yaw rate sensor 125 is an example, and the yaw rate sensor 125 may include various other positions or locations of the vehicle 102. In a further example, the vehicle 102 may include one or more sensors 126a-126d (e.g., wheel encoders) for measuring a wheel speed of a respective wheel (e.g., determining a linear speed of the vehicle 102 at a wheel). In FIG. 1B, the sensors 126a and 126c are depicted in broken lines to convey that, in some examples, the sensors 126a and 126c may be obscured behind a respective wheel (at least from the perspective provided in FIG. 1B). These are just some examples of sensors, and the vehicle may include other sensors, such as those described with respect to the system 500. In addition, the placement of the sensors relative to the vehicle 102 in FIG. 1B is an example, and in other examples, the sensors (e.g., 124a-124d, 125, and 126a-126d) may be arranged at other positions on the vehicle 102.

In additional examples, the vehicle 102 may include various steering components, such as a steering motor 128 and a steering rack 130 that operate to affect a commanded angle of each wheel 120a-120d (e.g., autonomously commanded and/or manually commanded). For example, the steering motor 128 may generate a rotational output based on steering input (e.g., direction and amount) from a manually operated steering wheel (not shown), from a computing device (e.g., planning 536 in FIG. 5), or from a combination thereof. The rotational output may be transferred to the steering rack 130 to create linear steering rack travel in one direction or another. The steering rack 130 may interface with each wheel at a knuckle of the suspension assembly or some other coupling that transfers the linear rack travel to the wheel to cause the wheel to pivot or rotate about an axis. In examples, the vehicle 102 may include one or more steering sensors 132 for determining steering data associated with the commanded angle of each of the wheels 120a-120d. For example, the steering sensor 132 may determine an amount of steering-motor rotation, an amount of steering rack travel, or other data, which may be related to the commanded angle of each wheel. That is, in some instances, a commanded angle may be selected for execution, and the commanded angle may correlate with an amount of steering motor rotation and/or rack travel. As such, in some examples, a commanded angle may be determined based on given steering data by referencing the correlation. In other examples, a correlated command angle that is based on the steering data may be compared to a command angle selected by or received from another component (e.g., trajectory planner) to assess consistency. In FIG. 1B, a steering assembly is depicted in the front end 104 and rear end 106 of the vehicle. In other aspects, only one end of the vehicle may include a steering assembly while the other end is fixed. Alternative aspects of the disclosure may include a different steering arrangement. For example, each suspension assembly may include a respective steering motor that, without a shared or common steering rack, affects the command angle of a wheel (e.g., by rotating about a steering axis). As such, the steering motor rotation may affect the wheel command angle without relying on the shared or common steering rack.

In some instances, steering components may be used to impart an angle on one or more wheels of the vehicle 102, such as when the vehicle is executing a turn (e.g., one of the turn maneuvers in FIG. 1A). For example, in FIG. 1B the front wheels 120a and 120b are rotated to the left. In addition, the steering components may impart the actual wheel angle based on a commanded wheel angle from another component (e.g., trajectory planner, manual steering wheel, etc.) or the steering sensor data may be used to determine a commanded angle based on a correlation. However, in some instances, such as loss of tire traction, mechanical slip of steering components, component noise or inaccuracies, the commanded angle (e.g., from the other component or based on the steering data correlation) may not accurately reflect the actual angle of each wheel. For example, referring to FIG. 1C, the actual orientations of the front wheels 120a and 120b are illustrated with the directional arrows 122a and 122b; however, the orientations reflected by the commanded angles 132a and 132b (also indicated in FIG. 1C by $\Theta''$ and $\Theta'''$) are indicated by the broken-line command arrows 134a and 134b and are inconsistent with the actual-orientation arrows 122a and 122b. As such, some examples of the present disclosure are directed to estimating a wheel angle (e.g., $136a/\Theta$ and $136b/\Theta'$) of a wheel (e.g., 120a and 120b) based on non-steering variables, and in some examples, the estimated wheel angle based on non-steering variables may be used to determine the velocity of the vehicle.

Referring back to FIG. 1A, motion of the vehicle 102a/b/c may be described in various ways. In one example, each turn maneuver may be associated with a respective arc or circular segment. That is, when the vehicle 102a/b/c is executing a turn maneuver and each wheel is at a respective angle, an assumption may be made that the vehicle 102a/b/c rotates around a center of a circle (e.g., the turn center) along the arc. Under this assumption, in FIG. 1A, the vehicle 102a rotates along an arc and around a turn center 16 of a first circle 18 (e.g., along a segment of the first circle 18). In addition, the vehicle 102b rotates along an arc and around a turn center 20 of a second circle 22 (e.g., along a segment of the second circle 22). In the example of FIG. 1A, the wheels (e.g., front wheels) of the vehicle 102a may be turned to a lesser degree than the wheels of the vehicle 102b, as illustrated by the radius 24 of the first circle 18 being larger than the radius 26 of the second circle 22. As such, the vehicle 102a can be described as executing a first turn maneuver (associated with the wheels turned to the lesser degree), and the vehicle 102b can be described as executing a second turn maneuver (associated with the wheels turned to the greater degree).

In examples of the disclosure, a first velocity (e.g., speed and direction) may be determined with respect to the first turn maneuver, and a second velocity (e.g., speed and direction) may be determined with respect to the second turn maneuver (as well as, in some examples, velocities of the vehicle when transitioning from the first velocity to the second velocity). Based on the velocities, the motion and relative position of the vehicle may be tracked and used in various operations. For example, the first velocity may be used by a localization component 26a to determine a pose 28a of the vehicle 102a at time n–3, and the second velocity may be used by a localization component 26b to determine a pose 28*b* of the vehicle 102*b* at time n. Among other things, the pose of the vehicle at different times may be combined with map data to track vehicle movement through, and interaction with, the environment 100. For example, in FIG. 1A the vehicle 102*a* includes a map component 30*a* with a map at n−3 32*a* (e.g., of the environment 100), and the vehicle 102*b* includes a map component 30*b* with a map at n 32*b* (e.g., of the environment 100). In examples, the pose 28*a* may be combined with the map data 32*a*, and the pose 28*b* may be combined with the map data 32*b*. For instance, the pose and map data may be use by the planner 34*a* and 34*b* to generate and output one or more proposed trajectories 36*a* and 36*b* for the vehicle 102*a/b/c*, which may be used to compile the trajectory 14.

Figure 2:
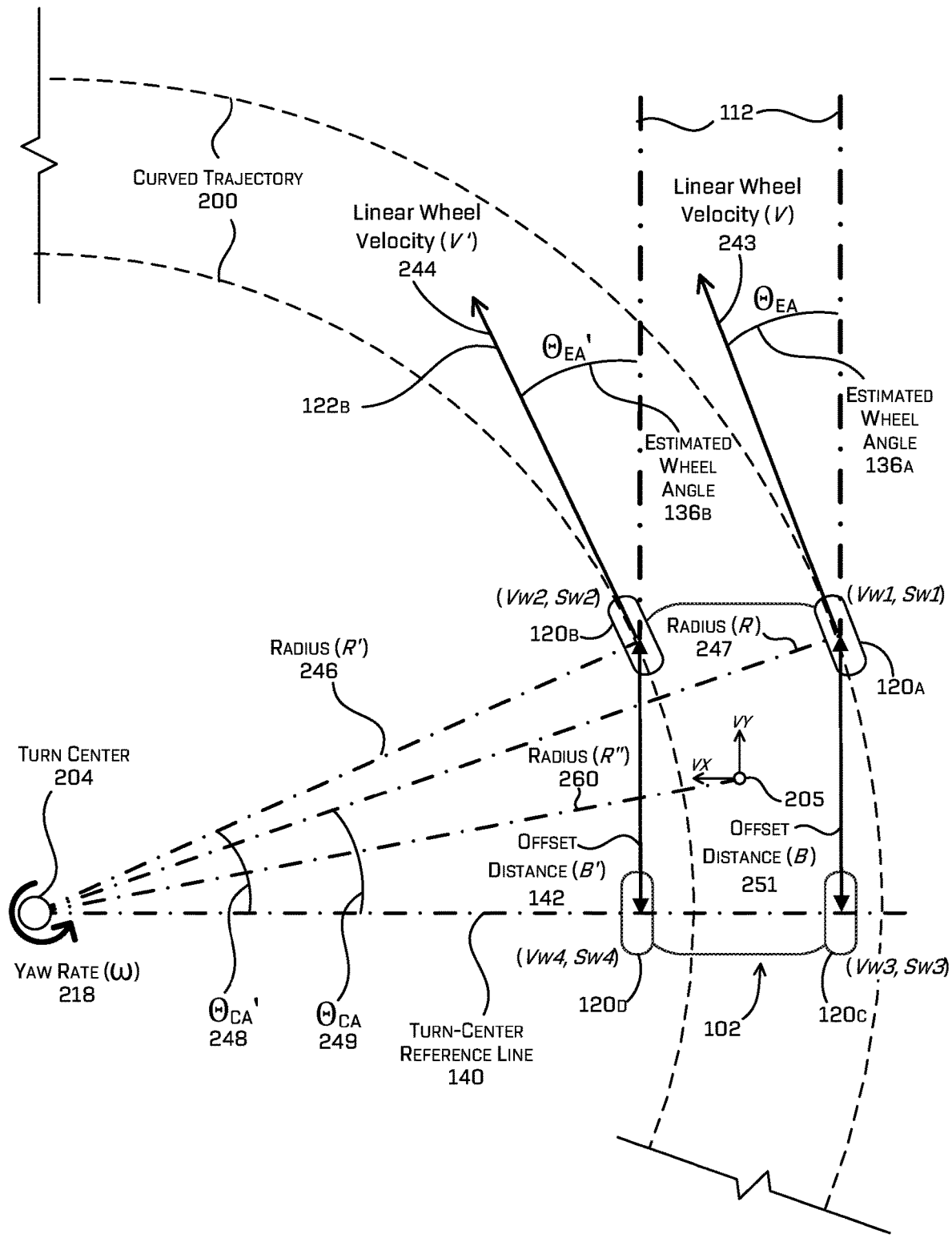
FIG. 2 illustrates a schematic of a vehicle traversing a turn with two wheels rotated at respective angles, the schematic including variables that may be used to determine a vehicle velocity or describe the turn or a component of the vehicle, as described herein.

Examples of the present disclosure include determining a vehicle velocity of the vehicle 102*a/b/c* associated with a turn maneuver. For example, referring to FIG. 2, various elements are schematically depicted in the context of the vehicle 102 executing a curved trajectory 200 (or turn maneuver, such as the first or second turn maneuver depicted in FIG. 1A), which is illustrated by the dashed line circles in FIG. 2. In FIG. 2, a reference point 205 of the vehicle 102 is depicted, and in some examples, the reference point 205 is a known central position on the vehicle 102 (e.g., the center of the vehicle 102) for generally characterizing one or more states of the vehicle 102 (e.g., states of the vehicle relating to localization or other operations, such as a pose of the vehicle at which the vehicle includes a velocity). In addition, dimensions associated with the vehicle 102 are known, such as a distance from the reference point 205 to each of the wheels 120*a*-120*d*.

At least some examples of the present disclosure are directed to estimating a vehicle velocity ($v_x$, $v_y$) at the reference position 205 based on velocities at multiple points of the vehicle. For example, the velocities at multiple points may be based on variables associated with the wheels 120*a*-120*d* (e.g., wheel angle (or some representation of the angle such as a sine of the wheel angle) and linear speed at the wheel). In other examples, velocities at multiple points may be based on other data (e.g., bumper mounted sensor). For example, consider the following Equation 1 (based on the velocity of two points fixed on a rigid body)

$$Vw = Vb + \omega \times BW \quad (2)$$

where the velocity at a wheel (Vw), such as magnitude and direction, is equal to the velocity at the reference point 205 (Vb), plus the cross product between a first vector associated with the yaw rate (ω) and a second vector (e.g., position vector) between the wheel (W) and the reference point 205 (B). In other words, from a given velocity ($v_x$, $v_y$) at the reference position 205, a velocity (e.g., magnitude and orientation) at each of the wheels (or other point) may be generated. Thus it follows that, based on Equation 2, where the yaw rate is known, as well as the velocity at one or more of the points or wheels (e.g., Vw1, Sw1, Vw2, Sw2, Vw3, Sw3, Vw4, and Sw4), the velocity ($v_x$, $v_y$) at the reference position 205 can be solved that best matches these known measurements. In some examples, because more measurements (e.g., yaw rate, Vw1, Sw1, Vw2, Sw2, Vw3, Sw3, Vw4, and Sw4) are known than unknown (e.g., Vb or ($v_x$, $v_y$)), an optimization (e.g., a least squares optimization (e.g., Gauss-Newton method)) may be used to determine or solve for the vehicle velocity ($v_x$, $v_y$) that best matches the set of variables associated with the vehicle wheels. This vehicle velocity may then be used by downstream components for various operations (e.g., localization). Among other things, using an optimization may account for measurement noise among the set of variables, as well as outlier variables. As such, as explained below, at least some examples of the present disclosure are directed to determining a speed of the vehicle at each wheel (e.g., Vw1, Vw2, Vw3, and Vw4) and an angle or orientation (or sine thereof) of each wheel (e.g., Sw1, Sw2, Sw3, and Sw4).

In at least some examples of this disclosure, a yaw rate (ω) 218 may be received from a yaw rate sensor (e.g., IMU, gyroscope, etc.). In addition, a speed at each wheel (e.g., linear velocity (V) 243 (or Vw1) and linear velocity (V') 244 (or Vw2)) may be derived from a variety of different sources. For example, in some instances, linear velocity at each wheel (e.g., Vw1, Vw2, Vw3, and Vw4) may be derived from data received from a respective wheel encoder (or other sensor, such as radar).

In addition, FIG. 2 depicts different variables, dimensions, and relationships, which may relate to determining an estimated wheel angle of each wheel (e.g., estimated wheel angles 136*a* and 136*b*). For example, FIG. 2 depicts a turn center 204. In at least some examples, techniques of the present disclosure may estimate the location of a turn center 204 of the curved trajectory 200 (e.g., based on commanded wheel angles, vehicle dimensions, and geometric relationships). For example, the wheel angle for each wheel may be based on the commanded angles from a planner and/or wheel angles provided by steering components. In some examples, the wheel angles may be combined with vehicle dimensions (e.g., wheelbase) to determine the turn center 204 based on the position at which the radius (R) 247 from the wheel 120*a* intersects the radius (R') 246 from the wheel 120*b*.

In addition, FIG. 2 depicts a turn-center reference line 140 (see also the turn-center reference line 140 in FIG. 1C), which extends through the turn center 204 and normal to the longitudinal axis 112 of the vehicle 102. Further, based on the dimensions of the vehicle 102, an offset distance 142 for the wheel 120*b* and an offset distance 251 for the wheel 120*a* (FIGS. 1C and 2) extends perpendicularly from the turn-center reference line 140 to the center of the wheel 120*b*. In general, the offset distances 142 and 251 extend from the wheel (e.g., a rotation axis of the wheel) to a position aligned with the turn center 204 and/or the turn-center reference line 140 (e.g., aligned along a plane or line extending through the turn center 204 and normal to the longitudinal orientation of the vehicle).

The turn center 204 and the turn-center reference line 140 may be established using various techniques. For example, if a vehicle is executing a turn using only front-wheel steering (while the rear wheel do not rotate about a steering axis), such as the vehicle 102 in FIG. 2 in which the front left wheel 120*b* and the front right wheel 120*a* rotate about a steering axis, then the turn-center reference line 140 is co-axial with a rear axle of the vehicle, and the offset distance may be pre-determined based on vehicle dimensions. In other examples, as explained above, the turn center 204 may also be at an intersection of the radius (R') 246 (e.g., of the curve or arc traversed by the front left wheel 120*b*) and the radius (R) 247 (e.g., of the curve or arc traversed by the front right wheel 120*a*). As indicated, these radii (and the resulting turn center) may be initially estimated from various data, such as the commanded angles the vehicle is attempting to execute (e.g., as provided by or retrieved from a trajectory planner and/or steering component). While some degree of error may exist in this initial estimate of the turn center, which is based on the commanded angles, in many instances it may only exist in the lateral orientation, which would still provide an accurate offset distance 142 based on the turn-center reference line 140 being in the same location regardless of the lateral position of the turn center. In addition, in some instances, the turn center 204 may be determined using only two radii generated from respective commanded angles (even if the vehicle is using four-wheel steering), such that noisier commanded angles may be omitted (or given less weight) when determining the turn center 204 and offset distance 142. Furthermore, an average turn center may be determined, which may also reduce the impact of an imprecise or inaccurate commanded steering angle on the offset distance determination.

FIG. 2 depicts additional variables with respect to each of the front wheels 120*a* and 120*b*. For example, FIG. 2 depicts an estimated wheel angle 136*a* ($\Theta_{EA}$) associated with the wheel 120*a*, as well as a central angle 249 ($\Theta_{CA}$) between the turn-center reference line 140, the turn center 204, and a radius (R) 247 intersecting the center of the wheel 120*a*. In addition, FIG. 2 depicts an estimated wheel angle 136*b* ($\Theta_{EA}'$) associated with the wheel 120*b*, as well as a central angle 248 ($\Theta_{CA}'$) between the turn-center reference line 140, the turn center 204, and a radius (R') 246 intersecting the center of the wheel 120*a*. In examples, the estimated wheel angle associated with a wheel is equal to the central angle associated with the wheel. Based on the non-steering variables depicted in FIG. 2, various functions may be expressed to describe relationships among the variables. For example, a sine trigonometric function may be expressed as:

$$\sin(\Theta_{CA}) = B/R \quad (2)$$

where $\Theta_{CA}$ is the central angle 249 (e.g., between the turn-center reference line 140, the turn center 204, and the radius (R) 247 passing through the center of the wheel 120*a*); B is equal to the offset distance 251; and R is equal to the radius 247.

In addition, a relationship exists between the radius (R) 247 (e.g., expressed in meters), the linear velocity (V) 243 at the wheel 120*a* (e.g., expressed in meters/second), and the yaw rate ($\omega$) 218 (e.g., expressed as 1/second or s$^{-1}$), where:

$$R = V/\omega \quad (3)$$

By substituting R in Function 2 with Function 2, an estimated wheel angle 136*a* ($\Theta$) may be calculated using:

$$\Theta_{EA} = \arcsin(B*(\omega/V)) \quad (4)$$

As indicated above, the estimated wheel angle associated with a wheel is equal to the central angle associated with the wheel. As such, using Function 4, an estimated wheel angle 136*a* ($\Theta_{EA}$) between the orientation of the wheel and the vehicle longitudinal orientation 112 may be calculated based on non-steering variables including the offset distance (B) 251, the linear wheel velocity (V) 243, and the yaw rate ($\omega$) 218. In addition, using Function 4 with a respective linear wheel velocity 244, an estimated wheel angle 136*b* ($\Theta_{EA}'$) may be calculated for the wheel 120*b*. Furthermore, where the vehicle 102 is executing a front-wheel only turn maneuver, the estimated wheel angles for the wheels 120*c* and 120*d* may be determined to be 0 degrees.

In examples of the present disclosure, based on the above, variables associated with each wheel 120*a*-120*d* of the vehicle 102 may be determined, including the linear velocity (e.g., speed or wheel speed) of the vehicle 102 at each wheel (e.g., Vw1, Vw2, Vw3, and Vw4), which may be determined based on sensor data), as well as the estimated wheel angle of each of the wheels or sine thereof (e.g., Sw1, Sw2, Sw3, and Sw4, which may be determined based on Equation 4). In at least some examples, the variables associated with each wheel 120*a*-120*d* (e.g., Vw1, Sw1, Vw2, Sw2, Vw3, Sw3, Vw4, and Sw4) are used to determine the vehicle velocity ($v_x$, $v_y$) at the position 205. For example, as indicated above and based on Equation 1, a least squares method may be used to solve for the velocity that best matches the variables (e.g., by using a function and a given vehicle velocity to output variables associated with each wheel). In some instances, for the velocity of each wheel (Vw), two different factors may be constructed, including a velocity magnitude, which can be compared to the speed (e.g., from the sensor), and an orientation. That is, in some examples, when solving Equation 1 in the least squares method, the velocity at each wheel (Vw) may be represented as magnitude and orientation, since those variables can be matched against the known or measured variables. In at least some examples, a loss function (e.g., Cauchy loss function) may be added on residuals related to the velocity magnitude, which may help address outliers (e.g., such as when a wheel slips). In some examples, the sines of the angles (e.g., estimated wheel angle and orientation output by the function of the solver) may be compared when determining residual values and finding the best match. As indicated above, using a least squares method may help reduce an impact of noise and outliers (e.g., sensor noise, wheel slip, etc.) on the vehicle velocity determination.

In further examples, an estimated wheel angle determined using non-steering variables may be used in various manners. For example, an estimated wheel angle 136*a* and 136*b* may be calculated for each wheel 120*a* and 120*b* using Function 3, which may provide additional insight into the actual motion of the vehicle. Among other things, the estimated wheel angles may provide redundancy (e.g., when determined in addition to commanded angles from other systems) or may be directly used to control vehicle operations. In some examples, the estimated wheel angle 136*a* and 136*b* for each wheel 120*a* and 120*b* may be compared to a commanded angle 132*a* and 132*b* for each wheel. The comparison may be used in various manners. For example, the comparison may be used to determine whether the estimated wheel angle and/or the command angle are reliable. In some examples, if a difference (e.g., variance) between the estimated angle and the commanded angle exceeds a threshold, then the commanded angle may be down weighted (e.g., given a lower weight or give zero weight) in subsequent processes (e.g., dead reckoning algorithm or other localization processes; velocity calculations; etc.). In some examples, as indicated above, one or more of the estimated wheel angles may be used to estimate a vehicle velocity. That is, one or more of the estimated wheel angles may be used in a least squares method or algorithm to estimate the vehicle velocity. Among other things, vehicle velocity may be used to estimated relative positions (e.g., pose) of the vehicle as the vehicle executes one or more maneuvers, and in this respect, the relative position may be at least partially based on the estimated wheel angle. In some examples, a relative position of the vehicle may be based at least partially on the estimated wheel angle with or without solving for the vehicle velocity based on the least squares method.

In other examples, if a difference (e.g., variance) between the estimated angle and the commanded angle exceeds a threshold, then a slip event (e.g., wheel slip, mechanical slippage, vehicle skid, etc.) may be flagged (e.g., recorded, reported, tracked, etc.) indicating the subject wheel may have lost traction or slipped or the steering components controlling the command angle may have experienced mechanical slippage. For example, when one or more tires lose traction, then a yaw rate may be higher than the wheels have commanded to. In other words, the wheels may be commanded to a particular angle that, without a loss in traction, are expected to result in a particular yaw rate; however, when a loss in traction occurs, the yaw rate may be higher, which could result in a different estimated wheel angle. This in turn may generate a signal to the vehicle to regain control, such as by adjusting the steering, applying brakes, reducing an acceleration, powering opposite wheels, depressing or releasing a throttle, etc. In further examples, if a total count or frequency of slip events exceeds a threshold, then maintenance may be suggested (e.g., check tire tread or steering components). In additional examples, if slip events are flagged at multiple wheels, then a vehicle-skid event may be flagged indicating the vehicle skidded across a ground surface. In additional examples, the estimated command angle from non-steering variables may be combined with the measured command angle (e.g., averaged) for use by downstream components (e.g., localization).

In addition, the estimated angle may be directly used (e.g., independent of measured command angle) by downstream processes to determine vehicle position, which may be used for localization or other map related operations (e.g., pose estimation). In other examples, the estimated angle may be used to determine or quantify other conditions associated with a wheel suspension assembly. For example, in some examples, a relationship may exist between the command angle of the wheel, a ride height of the vehicle at the wheel (e.g., damper displacement), and a ball-joint articulation angle (e.g., associated with a ball joint in the suspension assembly), such that the command angle may be used in combination with a ball-joint articulation angle to estimate the vehicle ride height. In at least one example, the estimated command angle may be used (e.g., in combination with ball joint sensor data) to estimate vehicle ride height as described in U.S. application Ser. No. 17/246,375 (titled "Determining Vehicle Ride Height Using A Ball Joint Sensor" and filed Apr. 30, 2021), which is incorporated herein by reference in its entirety and for all purposes.

Figure 3:
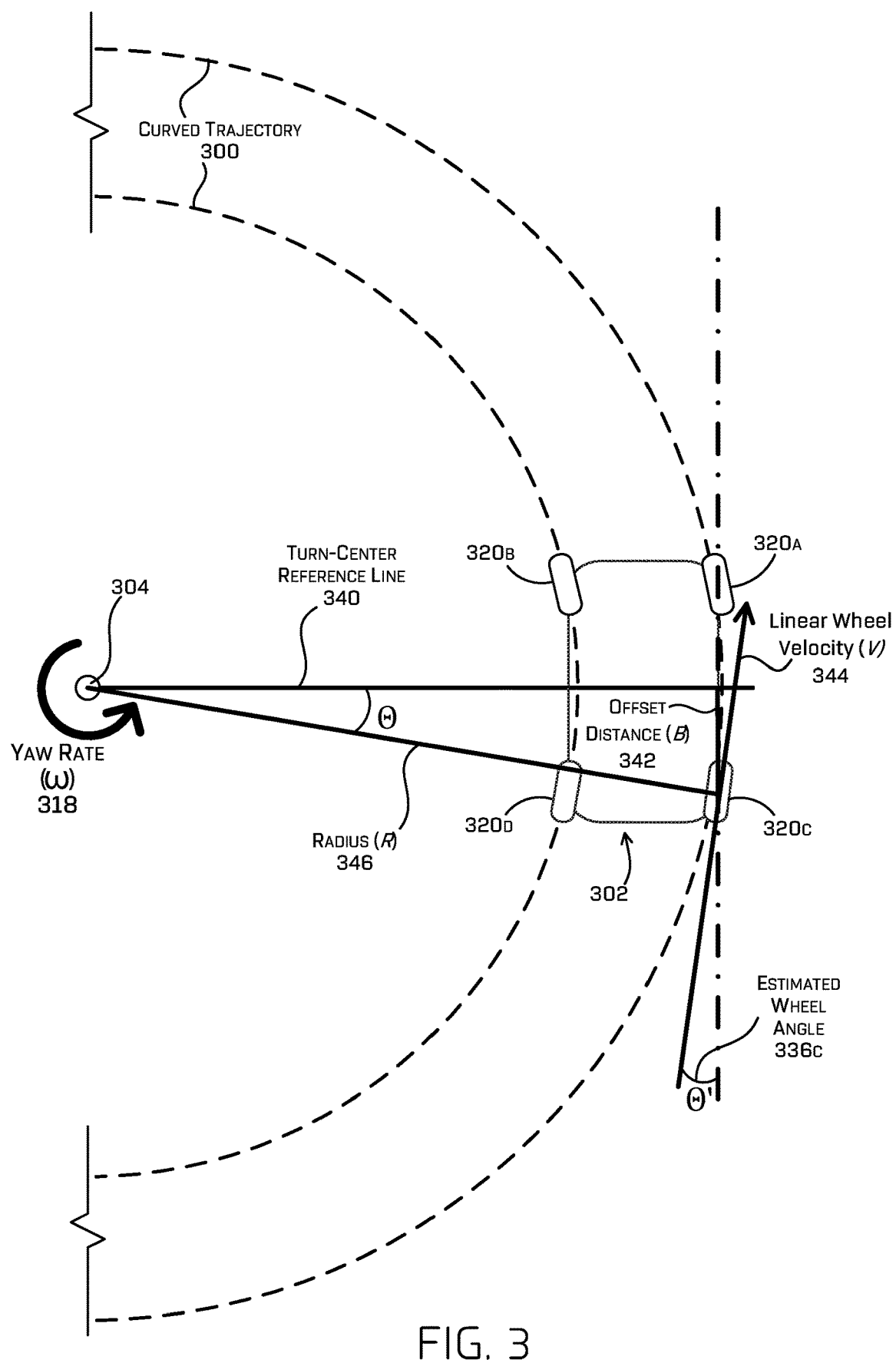
FIG. 3 illustrates a schematic of a vehicle traversing a turn with four wheels rotated at respective angles, the schematic including variables that may be used to describe the turn or a component of the vehicle, as described herein.

Referring to FIG. 3, another example is depicted including a schematic of a vehicle 302 executing a curved trajectory 300, which is illustrated by the dashed line circles. In FIG. 3, the vehicle 302 includes four-wheel steering, such that the front wheels 320a and 320b and the back wheels 320c and 320d pivot or rotate about a respective steering axis to an angle when executing the curved trajectory. In examples of this disclosure, as between the vehicle 102 executing two-wheel steering and the vehicle 302 executing four-wheel steering, the respective turn-center reference lines may be different; however, estimated wheel angles may still be determined based on yaw rate, wheel linear velocity, and offset.

For example, in FIG. 3, the curved trajectory 300 includes a turn center 304, and a turn-center reference line 340, which extends through the turn center 304 and normal to the longitudinal axis 312 of the vehicle 302. As explained above, the turn center 304 and the turn center-reference line 340 may be determine in various manners, such as based on the commanded angles of the wheels (e.g., at an intersection of a radius of two or more of the wheels). In addition, where the left-side wheels (e.g., front-left wheel and back-left wheel) include similar angles (except in different directions) and the right-side wheels (e.g., front-right wheel and back-right wheel) includes similar angles (except in different directions), then the turn-center reference line 340 may bisect a gap spacing apart the front axle and the rear axle. Furthermore, based on the dimensions of the vehicle 302, an offset distance 342 extends perpendicularly from the turn-center reference line 340 to the center of each wheel. In further examples, a radius 346 of the curve or arc traversed by each wheel extends from the turn center 304 to the respective wheel. In additional examples, as described with respect to FIG. 2, a yaw rate ($\omega$) 318 may be received from a yaw rate sensor (e.g., IMU, gyroscope, etc.) and a linear wheel velocity (V) 344 may be received from an encoder (or other sensor). In examples, a linear velocity for each wheel may be based on sensor data (e.g. wheel encoder). With these non-steering variables, Function 4 illustrated above may be solved for the wheel 320c to calculate an estimated command angle 336c. FIG. 3 illustrates the variables as they relate to the wheel 320c, and similar (but respective) variables may be determined for each of the other wheels 320a, 320b, and 320d to calculate a respective estimated command angle for each wheel. As such, as described above with respect to FIG. 2, the variables associated with the wheels 320a-320d, including the speed at each wheel and the estimated wheel angle, may be used to determine a velocity of the vehicle, based on the least squares method and Equation 1. Each of the estimated angles may be used as described above, such as for direct consumption by a downstream component and/or to assess reliability of measured command angles based on steering data.

Figure 4A:
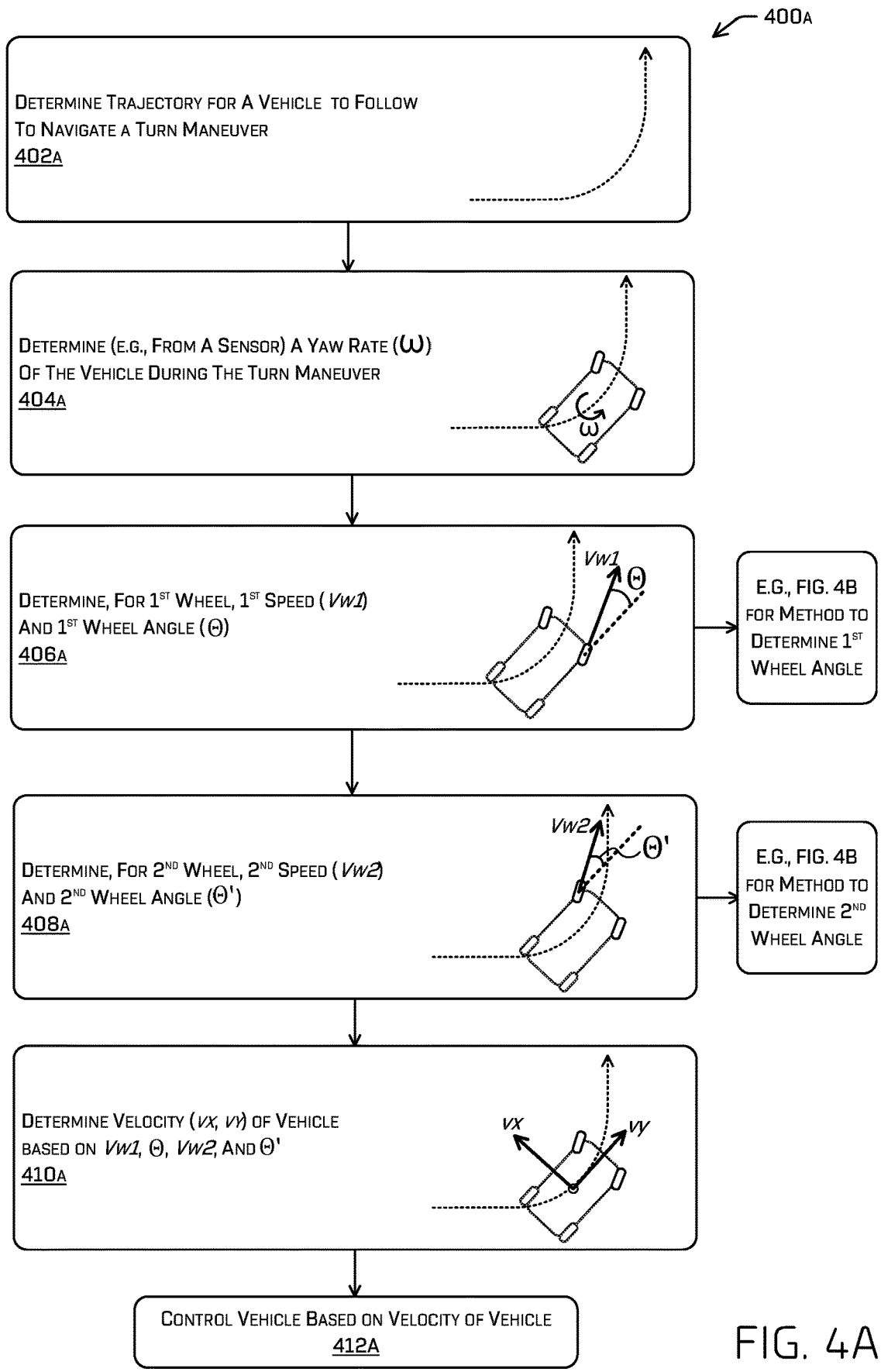
FIG. 4A includes a flow diagram illustrating an example process for determining a vehicle velocity, as described herein.
Figure 4B:
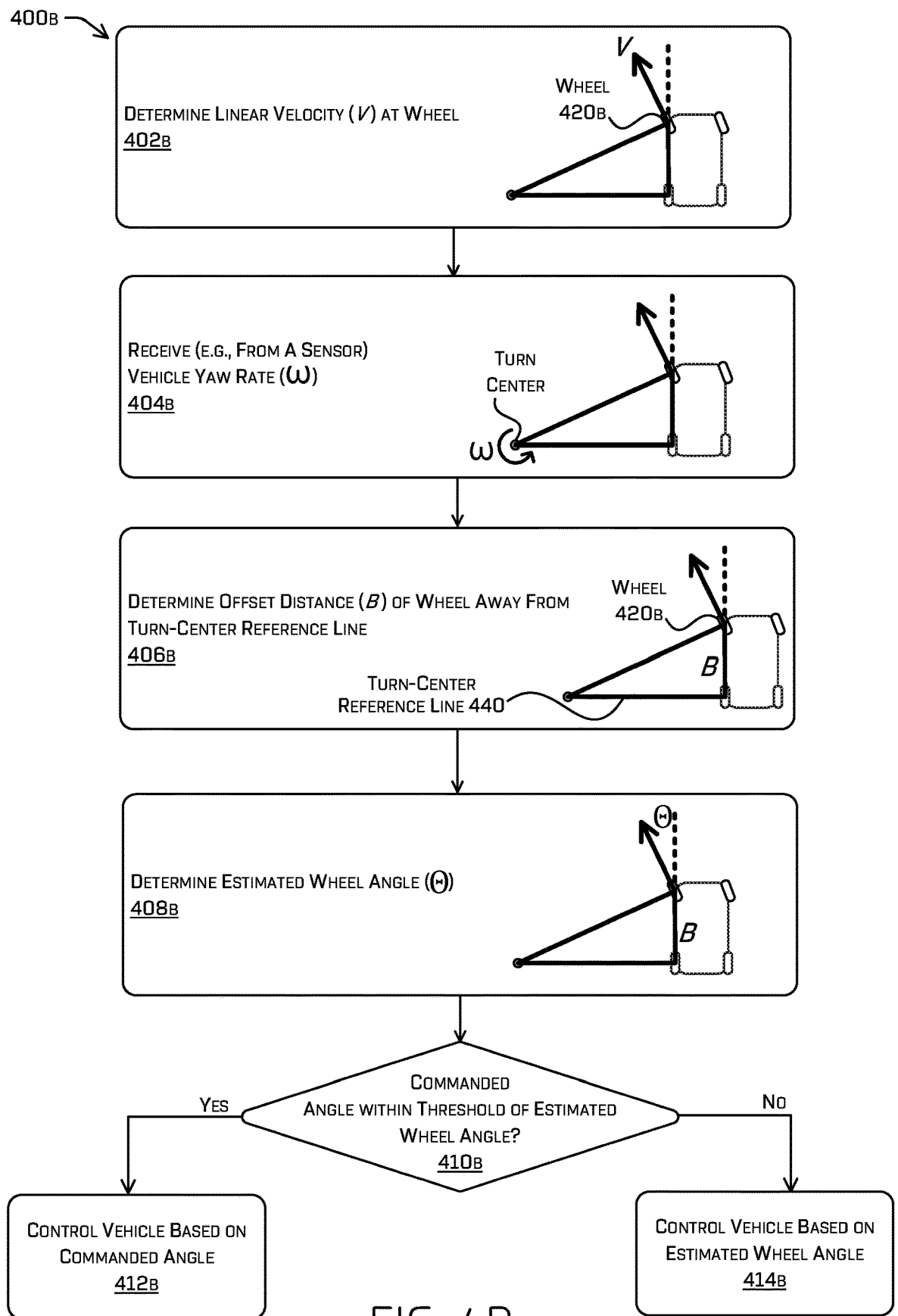
FIG. 4B includes a flow diagram illustrating an example process for determining estimated steering data, as described herein.

FIGS. 4A and 4B are flowcharts showing example processes involving techniques as described herein. The process illustrated in FIGS. 4A and 4B may be described with reference to components and elements described above with reference to FIGS. 1A, 1B, 1C, 2, and/or 3 for convenience and ease of understanding. In addition, some of the steps of the flowcharts are illustrated with pictographs that may include elements described with respect to FIGS. 1A-1C, 2, and 3. However, the process illustrated in FIGS. 4A and 4B is not limited to being performed using these components, and the components are not limited to performing the process illustrated in FIGS. 4A and 4B. The process illustrated in FIGS. 4A and 4B is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted or combined in any order and/or in parallel to implement the process.

FIG. 4A includes a flow diagram with operations or steps for a process 400a for determining a velocity of a vehicle. For example, the process 400a may be for estimating the velocity ($v_x$, $v_y$) of the vehicle 102 at the centralized reference position 205. The process includes, at step 402a, determining a trajectory for a vehicle to follow to navigate a turn maneuver. For example, the planner 34a/b or the planner 536 may determine a trajectory (e.g., 104 or curved trajectory 200) for the vehicle 102 or 502.

Step 404a includes determining, based at least in part on first sensor data from a first sensor, a yaw rate of the vehicle during the turn maneuver. For example, a yaw rate 218 may be based on sensor data from a yaw rate sensor 125. In addition, at step 406a, the process 400a includes determining, in association with a first wheel of the vehicle, (a) a first speed indicating a velocity of the vehicle associated with the first wheel during the turn maneuver; and (b) a first wheel angle indicating an orientation of the first wheel during the turn maneuver. For example, a linear speed (e.g., 243 or Vw1) associated with the wheel 120a may be determined from a wheel encoder 126a or other sensor. In addition, an estimated wheel angle 136a (or Θ in FIG. 4A) of the wheel 120a may be determined based on non-steering variables, such as by using Equation 4 (e.g., based on the linear velocity (e.g., 243 or Vw1) at the associated with the wheel 120a, the yaw rate (e.g., 218), and the offset distance (B) 251. For example, the estimated wheel angle may be determined based on a process 400b described with respect to FIG. 4B (explained below). In some examples, the wheel angle associated with the first wheel may be based on steering components (e.g., steering sensor 132).

Step 408a includes, determining, in association with a second wheel of the vehicle, (a) a second speed indicating a velocity of the vehicle associated with the second wheel during the turn maneuver; and (b) a second wheel angle indicating an orientation of the second wheel during the turn maneuver. For example, a linear speed (e.g., 244 or Vw2) associated with the wheel 120b may be determined from a wheel encoder 126b or other sensor. In addition, an estimated wheel angle 136b (or Θ' in FIG. 4A) of the wheel 120b may be determined based on non-steering variables, such as by using Equation 4 (e.g., based on the linear velocity (e.g., 244 or Vw2) at the associated with the wheel 120b, the yaw rate (e.g., 218), and the offset distance (B') 142. Similar to step 406a, the estimated wheel angle (Θ') may be determined based on the process 400b described with respect to FIG. 4B (explained below). In some examples, the wheel angle associated with the second wheel may be based on steering components (e.g., steering sensor 132).

The process includes, at step 410a, determining, using an optimization and based on at least the yaw rate, the first velocity, the first wheel angle, the second velocity, and the second wheel angle, a velocity of the vehicle at a centralized reference point of the vehicle during the turn maneuver. For example, based on the Equation 1 (e.g., predicted wheel velocities (e.g., speed and angle) generated by a function based on Equation 1), an optimization (e.g., least squares optimization (e.g., Gauss-Newton method)) may be used to determine the velocity at the centralized point 205 that best matches the variables associated with the wheels determined in steps 406a and 408a. In at least some examples, the least squares method may consider variables associate with four wheels of the vehicle.

Step 412a includes, controlling an operation of the vehicle based at least in part on the velocity of the vehicle. For example, the localization component 26a/b or 524 may use the third velocity to determine a pose of a vehicle. In some examples, the pose may be determined relative to a map and may be used to determine one or more trajectories for a vehicle to navigate an environment represented by the map.

In the process 400a, the velocity at the wheels may be based on wheel speed and wheel angle. In some examples, a velocity at multiple points may be determined in other manners, such as based on sensors that are mounted to bumpers, undercarriage frames, or other points on the vehicle and that can provide data usable to determine a velocity at that point. In that case, the velocities at those points may be used in an optimization to determine a velocity at a centralized point that best matches those values.

Referring to FIG. 4B, FIG. 4B includes a flow diagram with operations or steps for a process 400b for determining an estimated wheel angle of wheel of a vehicle, the estimated wheel angle being usable to control an operation of the vehicle. For example, the process 400b may be used to determine an estimated wheel angle 136b of the wheel 120b of the vehicle 102 or the estimated wheel angle 136a of the wheel 120a. The process 400b includes, at step 402b, determining a linear velocity at a wheel, and the pictorial representation associated with step 402b depicts the linear velocity (V) while the wheel 420b is turned to an orientation represented by the vector arrow. For example, sensor data may be received (e.g., when the vehicle is executing a turn 202) from the sensor 126b (e.g., wheel encoder) associated with the wheel 120b. In other examples, linear velocity at a wheel may be calculated or derived from a common velocity of the vehicle.

At step 404b, the process 400b includes receiving, from a second sensor, a vehicle yaw rate, and the pictorial representation associated with step 404b labels the yaw rate (ω) as the vehicle rotates about the turn center. For example, sensor data may be received from the yaw rate sensor 124 (e.g., IMU, gyroscope, etc.).

The process 400b includes, at step 406b, receiving an offset distance of the wheel away from the turn-center reference line, and the pictorial representation associated with step 406b labels the wheel offset (B) between the wheel 420b and the turn-center reference line 440. In some examples, the offset distance 142 may be based on the dimensions and geometry of the vehicle 102. For example, if the vehicle is executing a front-wheel steering turn (e.g., by rotating only front wheels while rear wheels remain aligned in the longitudinal orientation) then the turn-center reference line 440 may pass through (e.g., be co-axial with) the rear axle and the offset distance, based on vehicle dimensions, is the shortest distance between the wheel and the turn-center reference line 440. In another example, if the vehicle is executing a four-wheel steering turn, with left-side wheels rotated to similar angles (but in different directions) and right-side wheels rotate to similar angles (but in different directions), then the turn-center reference line may bisect the space between the front and rear axle and the offset distance is, based on vehicle dimensions, the shortest distance between the wheel and the turn-center reference line. In some examples, the offset distance may be determined by estimating a turn center (e.g., based on commanded wheel angles of two or more wheels) and a position of a turn-center reference line (based on the estimated turn center), and then determining the offset distance from the estimated position of the turn-center reference line.

In addition, at 408b, the process 400b includes determining the estimated wheel angle (Θ). For example, Function 4 may be solved for the estimated command angle using the linear velocity (V) from step 402b, the yaw rate (ω) from step 404b, and the offset distance (B) from step 406b.

In examples of this disclosure, the estimated wheel angle may be used in various manners. For example, the estimated wheel angle may be determined as the first wheel angle in step 406a of FIG. 4A and/or the second wheel angle in step 408a of FIG. 4A. In at least some examples, at step 410b, the estimated command angle is compared to a commanded wheel angle (e.g., from a trajectory planner and/or based on steering components) to determine whether the command angle is within a threshold value of the estimated wheel angle. If the measured command angle is within the threshold value ("Yes" at step 410b), then at step 412b, the vehicle may be controlled based on the commanded wheel angle.

For example, the commanded wheel angle may be used for localization or other downstream operations. If the commanded angle is not within the threshold value ("No" at step 410*b*), then at step 414*b*, the vehicle may be controlled based on the estimated wheel angle. For example, a weight value associated with the measured command angle may be reduced (e.g., receive a lower weight or zero weight) for use with downstream components based on a lower confidence in the measured command angle. In some examples, at step 414*b*, the commanded wheel angle and the estimated wheel angle may be combined (e.g., averaged) and the vehicle may be controlled based on the averaged wheel angle. In some examples, at step 414*b*, the estimated wheel angle may be used by downstream processes (e.g., for localization, positioning, dead reckoning, etc.) independently of the commanded angle. For example, the estimated wheel angle may be used in combination with one or more other estimated wheel angles (e.g., using a least squares method) to estimate a vehicle velocity, which may be used for determining relative positions as the vehicle maneuvers. In some examples, a difference may be determined between an estimated wheel angle and a commanded angle and operations that use (e.g., rely on or consume) the wheel angle could be augmented (e.g., increased or decreased accordingly) by the difference. In some examples, if the measured command angle is not within the threshold value, then at step 414*b* a slip event may be flagged or recorded (e.g., loss of tire traction, vehicle skidding, steering-component mechanical slippage, etc.).

Figure 5:
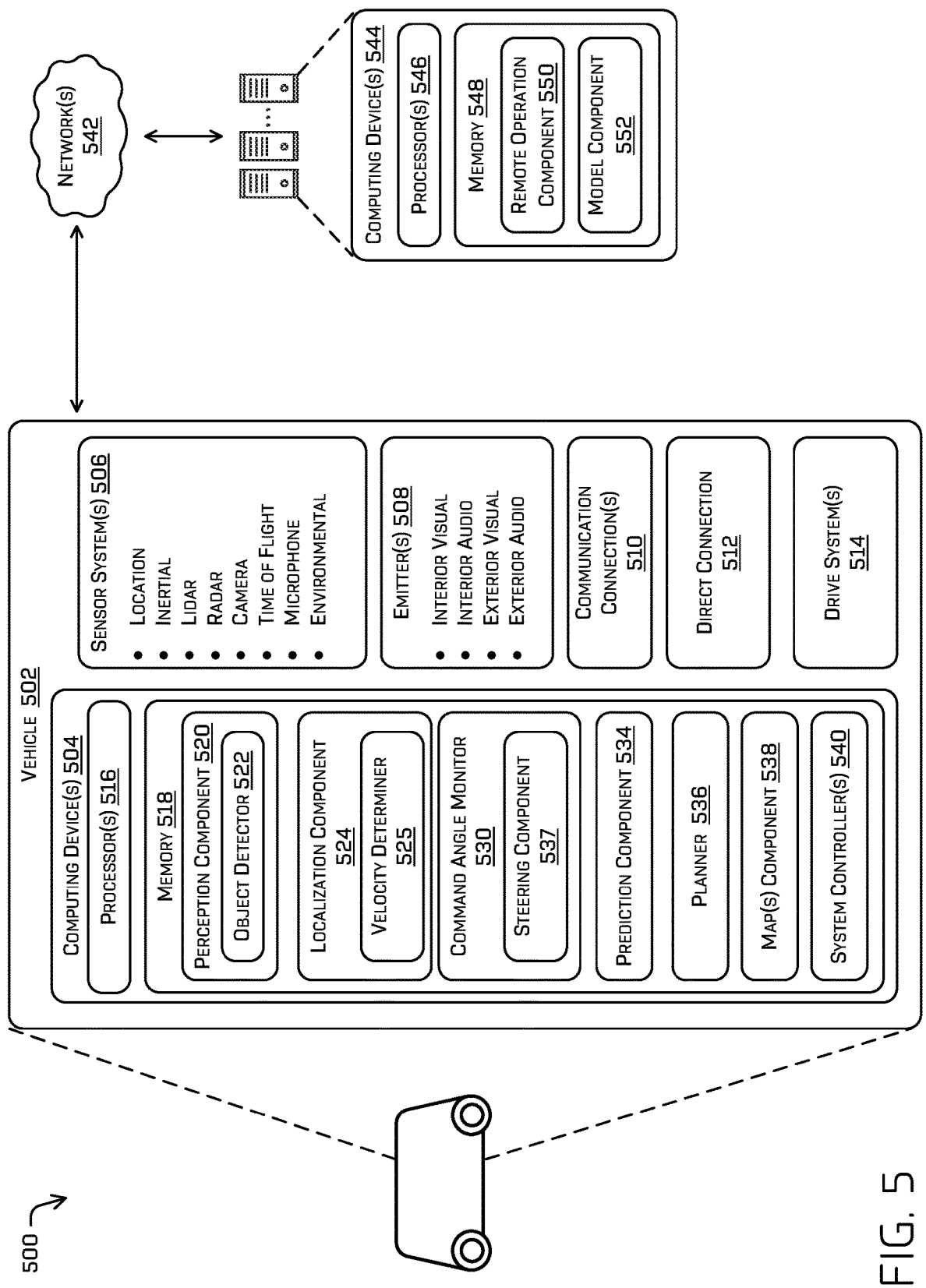
FIG. 5 is a block diagram illustrating an example system for performing techniques as described herein.

FIG. 5 depicts a block diagram of an example system 500 for implementing the techniques described herein. In at least one example, the system 500 can include a vehicle 502. In the illustrated example system 500, the vehicle 502 is an autonomous vehicle; however, the vehicle 502 can be any other type of vehicle. The vehicle 502 may be the vehicle 102 or 102*a/b/c* depicted in FIGS. 1A, 1B, 1C, and 2 and/or the vehicles depicted in FIGS. 3 and 4.

The vehicle 502 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 502 can be configured to control all functions from start to completion of the trip, including all parking functions, it may not include a driver and/or controls for driving the vehicle 502, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 502 can include one or more computing device(s) 504, one or more sensor system(s) 506, one or more emitter(s) 508, one or more communication connection(s) 510 (also referred to as communication devices and/or modems), at least one direct connection 512 (e.g., for physically coupling with the vehicle 502 to exchange data and/or to provide power), and one or more drive system(s) 514. The one or more sensor system(s) 506 can be configured to capture sensor data associated with an environment.

The one or more sensor system(s) 506 can include time-of-flight sensors, location sensors (e.g., GPS, compass, etc.), inertial sensors (e.g., sensor 124 including inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders (e.g., 126*a*-126*d*), ball joint sensors, chassis position sensors, etc. The one or more sensor system(s) 506 can include multiple instances of each of these or other types of sensors. For instance, the time-of-flight sensors can include individual time-of-flight sensors located at the corners, front, back, sides, and/or top of the vehicle 502. As another example, the camera sensors can include multiple cameras disposed at various locations about the exterior and/or interior of the vehicle 502. The one or more sensor system(s) 506 can provide input to the computing device 504.

The vehicle 502 can also include one or more emitter(s) 508 for emitting light and/or sound. The one or more emitter(s) 508 in this example include interior audio and visual emitters to communicate with passengers of the vehicle 502. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 508 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 502 can also include one or more communication connection(s) 510 that enable communication between the vehicle 502 and one or more other local or remote computing device(s) (e.g., a remote teleoperation computing device) or remote services. For instance, the one or more communication connection(s) 510 can facilitate communication with other local computing device(s) on the vehicle 502 and/or the one or more drive system(s) 514. Also, the one or more communication connection(s) 510 can allow the vehicle 502 to communicate with other nearby computing device(s) (e.g., other nearby vehicles, traffic signals, etc.).

The one or more communications connection(s) 510 can include physical and/or logical interfaces for connecting the computing device 504 to another computing device or one or more external networks 542 (e.g., the Internet). For example, the one or more communications connection(s) 510 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 502 can include one or more drive system(s) 514. In some examples, the vehicle 502 can have a single drive system 514. In at least one example, if the vehicle 502 has multiple drive systems 514, individual drive systems 514 can be positioned on opposite ends of the vehicle 502 (e.g., the front and the rear, etc.). In at least one example, the drive system(s) 514 can include one or more sensor system(s) 506 to detect conditions of the drive system(s) 514 and/or the surroundings of the vehicle 502. By way of example and not limitation, the sensor system(s) 506 can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 514. In some cases, the sensor system(s) 506 on the drive system(s) 514 can overlap or supplement corresponding systems of the vehicle 502 (e.g., sensor system(s) 506). The drive system(s) 514 may also include one or more steering motors (e.g., 128), steering motor sensors (e.g., 132), and steering racks (e.g., 130).

The drive system(s) 514 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 514 can include a drive system controller which can receive and preprocess data from the sensor system(s) 506 and to control operation of the various vehicle systems. In some examples, the drive system controller can include one or more processor(s) and memory communicatively coupled with the one or more processor(s). The memory can store one or more components to perform various functionalities of the drive system(s) 514. Furthermore, the drive system(s) 514 also include one or more communication connection(s) that enable communication by the respective drive system with one or more other local or remote computing device(s).

The computing device 504 can include one or more processor(s) 516 and memory 518 communicatively coupled with the one or more processor(s) 516. In the illustrated example, the memory 518 of the computing device 504 stores a perception component 520, a localization component 524, a command angle monitor 530, a prediction component 534, a planner 536, a maps component 538, and one or more system controller(s) 540. Though depicted as residing in the memory 518 for illustrative purposes, it is contemplated that the perception component 520, the localization component 524, the command angle monitor 530, the prediction component 534, the planner 536, the maps component 538, and the one or more system controller(s) 540 can additionally, or alternatively, be accessible to the computing device 504 (e.g., stored in a different component of vehicle 502) and/or be accessible to the vehicle 502 (e.g., stored remotely).

The perception component 520 can include functionality to perform object detection, segmentation, and/or classification. In some examples, the perception component 520 and/or the object detector 522 can provide processed sensor data that indicates a presence of an entity that is proximate to the vehicle 502 and/or a classification of the entity as an entity type (e.g., car, pedestrian, cyclist, building, tree, road surface, curb, sidewalk, unknown, etc.). In additional and/or alternative examples, the perception component 520 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. In one example, the perception component 520 may detect a ground surface and determine a ride height based on sensor data.

Further, the perception component 520 can include functionality to store perception data generated by the perception component 520. In some instances, the perception component 520 can determine a track corresponding to an object that has been classified as an object type. For purposes of illustration only, the perception component 520, using sensor system(s) 506 can capture one or more images of an environment, which may be used to determine information about an environment.

The stored perception data can, in some examples, include fused perception data captured by the vehicle. Fused perception data can include a fusion or other combination of sensor data from sensor system(s) 506, such as image sensors, lidar sensors, radar sensors, time-of-flight sensors, sonar sensors, global positioning system sensors, internal sensors, and/or any combination of these. The stored perception data can additionally or alternatively include classification data including semantic classifications of objects (e.g., pedestrians, vehicles, buildings, road surfaces, etc.) represented in the sensor data. The stored perception data can additionally or alternatively include track data (positions, orientations, sensor features, etc.) corresponding to motion of objects classified as dynamic objects through the environment. The track data can include multiple tracks of multiple different objects over time. This track data can be mined to identify images of certain types of objects (e.g., pedestrians, animals, etc.) at times when the object is stationary (e.g., standing still) or moving (e.g., walking, running, etc.). In this example, the computing device determines a track corresponding to a pedestrian.

In general, the object detector 522 can detect (among other things) semantic objects represented by sensor data. In some examples, the object detector 522 can identify such semantic objects and can determine a two-dimensional or a three-dimensional bounding box associated with the object. The object detector 522 can determine additional information such as a location, orientation, pose, and/or size (e.g., length, width, height, etc.) associated with the object. The object detector 522 can send data to other components of the system 500 for localization and/or determining calibration information, as discussed herein.

The localization component 524 can include functionality to receive data from the sensor system(s) 506 and/or other components to determine a position of the vehicle 502. In some examples, the localization component 524 may include a velocity determiner 525 for determining a velocity of a vehicle at a central reference point (e.g., 205), such as by executing operations described with respect to FIGS.

1A-1C, 2, 3, and 4. In addition, the localization component 524 can include and/or request/receive a three-dimensional map of an environment and can continuously determine a location of the autonomous vehicle within the map. In some instances, the localization component 524 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 524 can provide data to various components of the vehicle 502 to determine an initial position of an autonomous vehicle for generating a trajectory or for initial calibration. In examples of this disclosure, the localization component 524 may determine a position of the vehicle 502 based on the estimated command angle derived from non-steering variables. That is, the estimated command angle derived from non-steering variables may be directly used to determine position and/or may be used to validate other information (e.g., measured command angle) for determining position.

The command angle monitor 530 may determine command angles for wheels of the vehicle 502. For example, the command angle monitor 530 may communicate with (or receive data provided by) the sensor system(s) (e.g., yaw rate sensor, wheel encoder, steering sensor, etc.), and, based on data from the sensor system(s) determine an estimated wheel angle using Equation 4 and determine a measured command angle (e.g., from the steering components). The command angle monitor 530 may communicate the estimated wheel angle(s) to other systems (e.g., localization component 524 and/or velocity determiner 525) or may use the estimated command angle to validate a measured command angles. The command angle monitor 530 may include (or interface with) a steering component 537 for determining steering data, such as a rack travel distance, steering motor rotation, etc. In some examples, the command angle monitor 530 may compare an estimated wheel angle to a measured command angle, and if the difference (e.g., variance) exceed a threshold, may trigger a slip event or communicate the difference (e.g., variance) in a manner that down weights the measured command angle. Furthermore, the command angle monitor 530 may also execute other operations described in this disclosure, including those described with respect to FIGS. 1A, 1B, 1C, and 2-4.

The prediction component 534 can generate one or more probability maps representing prediction probabilities of possible locations of one or more objects in an environment. For example, the prediction component 534 can generate one or more probability maps for vehicles, pedestrians, animals, and the like within a threshold distance from the vehicle 502. In some instances, the prediction component 534 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

The planner 536 can determine a path for the vehicle 502 to follow to traverse through an environment. For example, the planner 536 can determine various routes and paths and various levels of detail. In some instances, the planner 536 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planner 536 can generate an instruction for guiding the autonomous vehicle along at least a portion of the route from the first location to the second location. In at least one example, the planner 536 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planner 536 can alternatively, or additionally, use data from the perception component 520 and/or the prediction component 534 to determine a path for the vehicle 502 to follow to traverse through an environment. For example, the planner 536 can receive data from the perception component 520 and/or the prediction component 534 regarding objects associated with an environment. Using this data, the planner 536 can determine a route to travel from a first location (e.g., a current location) to a second location (e.g., a target location) to avoid objects in an environment. In at least some examples, such a planner 536 may determine there is no such collision free path and, in turn, provide a path which brings vehicle 502 to a safe stop avoiding all collisions and/or otherwise mitigating damage.

The memory 518 can further include a maps component 538 that can be used by the vehicle 502 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. A map can further include an object identifier, an object classification, a three-dimensional location, covariance data (e.g., represented in image data or a multi-resolution voxel space), and the like. In some instances, a map can include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed, as discussed herein. In at least one example, the one or more maps 538 can include at least one map (e.g., images and/or a mesh). In some examples, the vehicle 502 can be controlled based at least in part on the map(s) component 538. That is, the map(s) component 538 can be used in connection with the perception component 520 (and sub-components), the localization component 524 (and sub-components), the prediction component 534, and/or the planner 536 to determine a location of the vehicle 502, identify objects in an environment, generate prediction probabilit(ies) associated with objects and/or the vehicle 502, and/or generate routes and/or trajectories to navigate within an environment.

In at least one example, the computing device 504 can include one or more system controller(s) 540, which can be configured to control steering, propulsion, braking, safety, emitters, communication, and other systems of the vehicle 502. These system controller(s) 540 can communicate with and/or control corresponding systems of the drive system(s) 514 and/or other components of the vehicle 502, which may be configured to operate in accordance with a path provided from the planner 536.

The vehicle 502 can connect to computing device(s) 544 via network 542 and can include one or more processor(s) 546 and memory 548 communicatively coupled with the one or more processor(s) 546. In at least one instance, the one or more processor(s) 546 can be similar to the processor(s) 516 and the memory 548 can be similar to the memory 518. In the illustrated example, the memory 548 of the computing device(s) 544 stores a remote operation component 550 and/or a model component 552. In at least one instance, the model component 552, after empirical testing and/or simulations, can include the models for determining a location and/or determining a calibration parameter, as discussed herein. Though depicted as residing in the memory 548 for illustrative purposes, it is contemplated that the remote operation component 550 and the model component 552 can additionally, or alternatively, be accessible to the computing device(s) 544 (e.g., stored in a different component of computing device(s) 544 and/or be accessible to the computing device(s) 544 (e.g., stored remotely).

The remote operation component 550 can include functionality to receive an indication of wheel-slip events, vehicle-skid events, steering-component slippage, and/or a request for preventative maintenance (e.g., based on a difference (e.g., variance) between estimated and measured command angles). In some examples, the remote operation component 550 can schedule a maintenance operation based on a command angle difference (e.g., variance) or a determination by the vehicle 502 that a difference is indicative of a degraded state (e.g., when steering data is inconsistent with estimated command angle data). In some examples, a remote operation component 550 can include teleoperators or operators who can control the vehicle 502 or can provide instructions to the vehicle based on a skid event (e.g., where a vehicle skid event suggest a loss of control).

The model component 552 can include functionality to generate models for determining a location and/or determine slip or skid events, as discussed herein. For example, the model component 552 can receive sensor data and can determine command angles associated with such sensor data. The model component 552 can aggregate data across a plurality of vehicles (e.g., a fleet of vehicles) to determine command angle variances indicative of normal operations and command angle variances indicative of degraded operations. Further, the model component 552 can associate a command angle variance with a time period of operating a sensor and a performance of components associated with such metrics to determine a predictive maintenance schedule associated with various sensors, as discussed herein.

The processor(s) 516 of the computing device 504 and the processor(s) 546 of the computing device(s) 544 can be any suitable processor capable of executing instructions to process data and perform operations as described herein. By way of example and not limitation, the processor(s) 516 and 546 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 518 computing device 504 and the memory 548 of the computing device(s) 544 are examples of non-transitory computer-readable media. The memory 518 and 548 can store an operating system and one or more software applications, instructions, programs, and/or data to implement the methods described herein and the functions attributed to the various systems. In various implementations, the memory 518 and 548 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, aspects of some or all of the components discussed herein can include any models, algorithms, and/or machine-learning algorithms. For example, in some instances, the components in the memory 518 and 548 can be implemented as a neural network. In some examples, a machine learned model could be trained to determine an estimated command angle, slip event, skid event, or other condition of the vehicle based on sensor data received from the yaw rate sensor, encoder, steering sensor, etc.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning or machine-learned algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

As described above with reference to FIGS. 1-5, techniques described herein can be useful for using a set of non-steering variables to estimate a command angle of a wheel. As described, a yaw rate, a wheel speed, and vehicle dimensions, can be used to estimate the command angle of the wheel. Among other things, command angles based on non-steering variables may provide redundancy (e.g., when determined in parallel with (in addition to) steering-based command angles) and validation and may be less susceptible to inaccuracies from steering-component slippage and loss of tire traction.

Example Clauses

A: A system comprising: one or more processors; and one or more non-transitory computer-readable media storing instructions executable by the one or more processors, wherein the instructions, when executed, cause the system to perform operations comprising: determining a trajectory for a vehicle to follow to navigate a turn maneuver; determining, based at least in part on first sensor data from a first sensor, a yaw rate of the vehicle during the turn maneuver; determining, in association with a first wheel of the vehicle, a first speed associated with the first wheel during the turn maneuver; and a first wheel angle indicating an orientation of the first wheel during the turn maneuver; determining, in association with a second wheel of the vehicle, a second speed associated with the second wheel during the turn maneuver, and a second wheel angle indicating an orientation of the second wheel during the turn maneuver; determining, using an optimization and based on at least the yaw rate, the first speed, the first wheel angle, the second speed, and the second wheel angle, a velocity of the vehicle at a centralized reference point of the vehicle during the turn maneuver; and controlling an operation of the vehicle based at least in part on the velocity.

B: The system of paragraph A, wherein: the turn maneuver comprises a turn center; and the first wheel angle is based at least in part on the yaw rate, the first speed, and an offset distance, the offset distance defining a distance extending from the first wheel and to a position aligned with the turn center.

C: The system of either paragraph A or B, wherein the first speed is based at least in part on second sensor data associated with a wheel encoder, and wherein the optimization comprises a least squares optimization.

D: The system of paragraph C, wherein the least squares optimization further includes determining a residual value associated with a sine of the first wheel angle and a sine of a predicted wheel angle.

E: The system of any one of paragraphs A-D, wherein controlling the operation of the vehicle comprises updating a position of the vehicle associated with the turn maneuver.

F: A method comprising: determining, based at least in part on first sensor data from a first sensor, a yaw rate of a vehicle during a turn maneuver; determining a first velocity associated with a first point on the vehicle; determining a second velocity associated with a second point on the vehicle; determining, using an optimization and based on at least the yaw rate, the first velocity, and the second velocity, a third velocity of the vehicle at a centralized reference point of the vehicle during the turn maneuver; and controlling an operation of the vehicle based at least in part on the third velocity.

G: The method of paragraph F, wherein: the first velocity is based on a first speed associated with a first wheel and on a first wheel angle; and the second velocity is based on a second speed associated with a second wheel and on a second wheel angle.

H: The method of paragraph G, wherein: the turn maneuver comprises a turn center; and the first wheel angle is based at least in part on the yaw rate, the first speed, and an offset distance, the offset distance defining a distance extending from the wheel and to a position aligned with the turn center.

I: The method of paragraph H, wherein: the method further comprises receiving, from a wheel encoder associated with the first wheel, wheel encoder data associated with the first speed; and the first speed and the first wheel angle are both based at least in part on the wheel encoder data.

J: The method of any one of paragraphs F-I, wherein the third velocity is determined based at least in part on the first velocity and on a cross product between a first vector associated with the yaw rate and a second vector between the first point and the centralized reference point.

K: The method of paragraph F, wherein: the optimization comprises a least squares optimization; and the method further comprises applying a loss function to a residual between the first velocity and a predicted velocity associated with the first point.

L: The method of paragraph K, wherein: the first velocity is comprised of a wheel angle; and the least squares optimization minimizes a residual between a sine of the wheel angle and a sine of a predicted wheel angle.

M: The method of any one of paragraphs F-L, wherein controlling the operation of the vehicle comprises updating a position of the vehicle associated with the turn maneuver.

N: One or more non-transitory computer-readable media storing instructions that, when executed, cause one or more processors to perform operations comprising: determining, based at least in part on first sensor data from a first sensor, a yaw rate of a vehicle during a turn maneuver; determining a first velocity associated with a first point on the vehicle; determining a second velocity associated with a second point on the vehicle; determining, using an optimization and based on at least the yaw rate, the first velocity, and the second velocity, a third velocity of the vehicle at a centralized reference point of the vehicle during the turn maneuver; and controlling an operation of the vehicle based at least in part on the third velocity.

O: The one or more non-transitory computer-readable media of paragraph N, wherein: the first velocity is based on a first speed associated with a first wheel and on a first wheel angle; and the second velocity is based on a second speed associated with a second wheel and on a second wheel angle.

P: The one or more non-transitory computer-readable media of paragraph O, wherein: the turn maneuver comprises a turn center; and the first wheel angle is based at least in part on the yaw rate, the first velocity, and an offset distance, the offset distance defining a distance extending from the first wheel and to a position aligned with the turn center.

Q: The one or more non-transitory computer-readable media of paragraph P, wherein: the operations further comprise receiving, from a wheel encoder associated with the first wheel, wheel encoder data associated with the first speed; and the first speed and the first wheel angle are both based at least in part on the wheel encoder data.

R: The one or more non-transitory computer-readable media of any one of paragraphs N-Q, wherein the third velocity is determined based at least in part on the first velocity and on a cross product between a first vector associated with the yaw rate and a second vector between the first point and the centralized reference point.

S: The one or more non-transitory computer-readable media of any one of paragraphs N-R, wherein: the optimization comprises a least squares optimization; the first velocity is comprised of a wheel angle; and the least squares optimizes minimizes a residual between a sine of the wheel angle and a sine of a predicted wheel angle.

T: The one or more non-transitory computer-readable media of any one of paragraphs N-S, wherein controlling the operation of the vehicle comprises updating a position of the vehicle associated with the turn maneuver.

While the example clauses described above are described with respect to one particular implementation, it should be understood that, in the context of this document, the content of the example clauses may also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
   one or more processors; and
   one or more non-transitory computer-readable media storing instructions executable by the one or more processors, wherein the instructions, when executed, cause the system to perform operations comprising:
   determining a trajectory for a vehicle to follow to navigate a turn maneuver;
   determining, based at least in part on first sensor data from a first sensor, a yaw rate of the vehicle during the turn maneuver;
   determining, in association with a first wheel of the vehicle,
      a first speed associated with the first wheel during the turn maneuver; and
      a first wheel angle indicating an orientation of the first wheel during the turn maneuver;
   determining, in association with a second wheel of the vehicle,
      a second speed associated with the second wheel during the turn maneuver, and
      a second wheel angle indicating an orientation of the second wheel during the turn maneuver;
   determining, using an optimization and based on first variables comprising at least the yaw rate, the first speed, the first wheel angle, the second speed, and the second wheel angle, a second variable comprising a velocity of the vehicle at a centralized reference point of the vehicle during the turn maneuver, wherein the optimization minimizes difference between the second variable and the first variables; and
   controlling an operation of the vehicle based at least in part on the velocity.

2. The system of claim 1, wherein:
   the turn maneuver comprises a turn center; and
   the first wheel angle is based at least in part on the yaw rate, the first speed, and an offset distance, the offset distance defining a distance extending from the first wheel and to a position aligned with the turn center.

3. The system of claim 1, wherein the first speed is based at least in part on second sensor data associated with a wheel encoder, and wherein the optimization comprises a least squares optimization.

4. The system of claim 3, wherein the least squares optimization further includes determining a residual value associated with a sine of the first wheel angle and a sine of a predicted wheel angle.

5. The system of claim 1, wherein controlling the operation of the vehicle comprises updating a position of the vehicle associated with the turn maneuver.

6. A method comprising:
   determining, based at least in part on first sensor data from a first sensor, a yaw rate of a vehicle during a turn maneuver;
   determining a first velocity associated with a first point on the vehicle;
   determining a second velocity associated with a second point on the vehicle;
   determining, using an optimization and based on first variables comprising at least the yaw rate, the first velocity, and the second velocity, a second variable comprising a third velocity of the vehicle at a centralized reference point of the vehicle during the turn maneuver, wherein the optimization minimizes difference between the second variable and the first variables; and
   controlling an operation of the vehicle based at least in part on the third velocity.

7. The method of claim 6, wherein:
the first velocity is based on a first speed associated with a first wheel and on a first wheel angle; and
the second velocity is based on a second speed associated with a second wheel and on a second wheel angle.

8. The method of claim 7, wherein:
the turn maneuver comprises a turn center; and
the first wheel angle is based at least in part on the yaw rate, the first speed, and an offset distance, the offset distance defining a distance extending from the wheel and to a position aligned with the turn center.

9. The method of claim 8, wherein:
the method further comprises receiving, from a wheel encoder associated with the first wheel, wheel encoder data associated with the first speed; and
the first speed and the first wheel angle are both based at least in part on the wheel encoder data.

10. The method of claim 6, wherein the third velocity is determined based at least in part on the first velocity and on a cross product between a first vector associated with the yaw rate and a second vector between the first point and the centralized reference point.

11. The method of claim 6, wherein:
the optimization comprises a least squares optimization; and
the method further comprises applying a loss function to a residual between the first velocity and a predicted velocity associated with the first point.

12. The method of claim 11, wherein:
the first velocity is comprised of a wheel angle; and
the least squares optimization minimizes a residual between a sine of the wheel angle and a sine of a predicted wheel angle.

13. The method of claim 6, wherein controlling the operation of the vehicle comprises updating a position of the vehicle associated with the turn maneuver.

14. One or more non-transitory computer-readable media storing instructions that, when executed, cause one or more processors to perform operations comprising:
determining, based at least in part on first sensor data from a first sensor, a yaw rate of a vehicle during a turn maneuver;
determining a first velocity associated with a first point on the vehicle;
determining a second velocity associated with a second point on the vehicle;
determining, using an optimization and based on first variables comprising at least the yaw rate, the first velocity, and the second velocity, a second variable comprising a third velocity of the vehicle at a centralized reference point of the vehicle during the turn maneuver, wherein the optimization minimizes difference between the second variable and the first variables; and
controlling an operation of the vehicle based at least in part on the third velocity.

15. The one or more non-transitory computer-readable media of claim 14, wherein:
the first velocity is based on a first speed associated with a first wheel and on a first wheel angle; and
the second velocity is based on a second speed associated with a second wheel and on a second wheel angle.

16. The one or more non-transitory computer-readable media of claim 15, wherein:
the turn maneuver comprises a turn center; and
the first wheel angle is based at least in part on the yaw rate, the first velocity, and an offset distance, the offset distance defining a distance extending from the first wheel and to a position aligned with the turn center.

17. The one or more non-transitory computer-readable media of claim 16, wherein:
the operations further comprise receiving, from a wheel encoder associated with the first wheel, wheel encoder data associated with the first speed; and
the first speed and the first wheel angle are both based at least in part on the wheel encoder data.

18. The one or more non-transitory computer-readable media of claim 14, wherein the third velocity is determined based at least in part on the first velocity and on a cross product between a first vector associated with the yaw rate and a second vector between the first point and the centralized reference point.

19. The one or more non-transitory computer-readable media of claim 14, wherein:
the optimization comprises a least squares optimization;
the first velocity is comprised of a wheel angle; and
the least squares optimizes minimizes a residual between a sine of the wheel angle and a sine of a predicted wheel angle.

20. The one or more non-transitory computer-readable media of claim 14, wherein controlling the operation of the vehicle comprises updating a position of the vehicle associated with the turn maneuver.

* * * * *